United States Patent
Osawa

(10) Patent No.: US 6,650,474 B2
(45) Date of Patent: *Nov. 18, 2003

(54) OPTICAL FILTER AND OPTICAL DEVICE PROVIDED WITH THIS OPTICAL FILTER

(75) Inventor: Keiji Osawa, Chuou-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/119,935

(22) Filed: Apr. 11, 2002

(65) Prior Publication Data

US 2002/0145802 A1 Oct. 10, 2002

Related U.S. Application Data

(62) Division of application No. 09/772,931, filed on Jan. 31, 2001, now Pat. No. 6,392,803, which is a division of application No. 09/281,324, filed on Mar. 30, 1999, now Pat. No. 6,327,085.

(30) Foreign Application Priority Data

Mar. 31, 1998 (JP) ............................ 10-101822
Jul. 13, 1998 (JP) ............................ 10-197610
Jan. 27, 1999 (JP) ............................ 11-18596

(51) Int. Cl.[7] .................... G02B 5/30; G02B 21/28; H04N 5/225
(52) U.S. Cl. .................. 359/495; 359/497; 359/498; 359/502; 359/352; 348/342; 396/268; 396/275; 396/429
(58) Field of Search ......................... 359/352, 494, 359/495, 497, 498, 499, 502; 348/342; 396/429, 268, 275, 276

(56) References Cited

U.S. PATENT DOCUMENTS 3,438,692 A 4/1969 Tabor
3,588,224 A 6/1971 Pritchard
4,100,570 A 7/1978 Nobutoki et al.
4,227,208 A 10/1980 Takanashi et al.
4,539,584 A 9/1985 Otake
4,575,193 A 3/1986 Greivenkamp, Jr.
4,587,553 A 5/1986 Watanabe et al.
4,605,956 A 8/1986 Cok
4,624,563 A 11/1986 Johnson
4,626,897 A 12/1986 Sato et al.
4,761,682 A 8/1988 Asaioa
4,805,028 A 2/1989 Nishioka et al.
4,977,450 A 12/1990 Yokota
4,988,171 A 1/1991 Yokota (List continued on next page.)

FOREIGN PATENT DOCUMENTS

| JP | S60-164719 | 8/1985 | |
| JP | 62-284 330 | * 12/1987 | |
| JP | B2-6-20316 | 3/1994 | |
| JP | 9-211222 | 8/1997 | |
| JP | 10-54960 | 2/1998 | ................ 359/497 |

Primary Examiner—Ricky D. Shafer
(74) Attorney, Agent, or Firm—Oliff & Berridge, PLC

(57) ABSTRACT

Light emitted from a taking lens 20 enters a first birefringent plate 1a to be spatially divided along a first direction extending perpendicular to the direction in which the light advances to achieve two separate rays L10 and L20. The vibrational planes of the two light fluxes L10 and L20 emitted from the first birefringent plate 1a are converted to a circularly polarized light by a phase plate 1c. The two light fluxes L10' and L20' emitted from the phase plate 1c are each spatially divided into two by a second birefringent plate 1d along a second direction extending perpendicular to the first direction to achieve four separate rays L12, L12, L21 and L22, to be guided to an imaging plane 15a of an imaging device 15. At least either the first birefringent plate or the second birefringent plate is constituted of lithium niobate, rutile, Chilean nitrate, or the like.

5 Claims, 21 Drawing Sheets

U.S. PATENT DOCUMENTS

| | | |
|---|---|---|
| 5,069,530 A | 12/1991 | Nishida et al. |
| 5,237,446 A | 8/1993 | Takahashi |
| 5,247,389 A | 9/1993 | Beausoleil |
| 5,249,041 A | 9/1993 | Shiraishi |
| 5,280,347 A * | 1/1994 | Shiraishi et al. |
| 5,434,709 A | 7/1995 | Yamada et al. |
| 5,452,129 A | 9/1995 | Shiraishi |
| 5,471,343 A | 11/1995 | Takasugi |
| 5,477,381 A | 12/1995 | Sasaki et al. |
| 5,579,420 A | 11/1996 | Fukushima |
| 5,715,085 A | 2/1998 | Takatori et al. |
| 5,739,855 A | 4/1998 | Centen et al. |
| 5,781,236 A | 7/1998 | Shinbori et al. |
| 5,894,357 A | 4/1999 | Murakami |
| 5,940,127 A | 8/1999 | Nakajima |
| 5,963,291 A | 10/1999 | Wu et al. |
| 6,081,346 A | 6/2000 | Terajima et al. |
| 6,327,085 B1 * | 12/2001 | Osawa et al. |
| 6,392,803 B2 * | 5/2002 | Osawa |

* cited by examiner

OPTICAL FILTER AND OPTICAL DEVICE PROVIDED WITH THIS OPTICAL FILTER

This is a Division of application Ser. No. 09/772,931 filed Jan. 31, 2001, now U.S. Pat. No. 6,392,803, which in turn is a Division of application Ser. No. 09/281,324 filed Mar. 30, 1999, now U.S. Pat. No. 6,327,085. The entire disclosure of the prior application(s) is hereby incorporated by reference herein in its entirety.

INCORPORATION BY REFERENCE

The disclosures of the following priority applications are herein incorporated by reference:

Japanese Patent Application No. 10-101822, filed Mar. 31, 1998

Japanese Patent Application No. 10-197610, filed Jul. 13, 1998

Japanese Patent Application No. 11-18596, filed Jan. 27, 1999

BACKGROUND OF THE INVENTION

1. Field of the Invention

The present invention relates to an optical filter and an optical device provided with this optical filter.

2. Description of the Related Art

In a digital still camera employing an imaging device such as a CCD (hereafter a digital still camera is simply referred to as a "DSC" in this specification), "beat" interference may occur as a result of a certain relationship between the spatial frequency of the subject image and the repetitive pitch of dot-type on-chip color separation filters provided at the front surface of the imaging device. In order to prevent any false color signals from being generated by the beat, i.e., in order to prevent the so-called "color moire," an optical low-pass filter is provided between the taking lens and the imaging device. The optical low-pass filter, which is constituted by employing a birefringent plate achieving birefringence, reduces the generation of the beat through the birefringent effect provided by the birefringent plate. Normally, quartz is employed to constitute the birefringent plate.

Japanese Examined Patent Publication No. 1994-20316 proposes an optical low-pass filter employing two birefringent plates such as that described above, which is suited for application in an imaging device provided with dot-type on-chip color separation filters. This optical low-pass filter is constituted by enclosing a quarter-wave plate between two birefringent plates with the directions in which the image becomes shifted through the birefringence offset by approximately 90° from each other.

Now, the so-called direct image forming system, in which the imaging device is directly provided at the primary image forming plane of the taking lens without employing a reduction lens system or the like is becoming the mainstay in single lens reflex type DSCs that allow interchange of the taking lens among DSCs in recent years. The advent of the direct image forming system has been realized through the utilization of imaging devices having a large image area of approximately 15.5 mm×22.8 mm that have been manufactured in recent years to replace ⅔" size (approximately 6.8 mm×8.8 mm) and 1" size (approximately 9.3 mm×14 mm) imaging devices that have been conventionally used in television cameras and the like. With this size of image area available, an image plane having a size (approximate aspect ratio 2:3=15.6 mm×22.3 mm), which is comparable to the image plane size of the C-type silver halide film IX240 system (APS), is achieved. By employing an imaging device achieving a relatively large image area, it becomes possible to adopt a camera system that employs the 135-type photographic film in a DSC. To explain this point, providing a ⅔" size or 1" size imaging device at the field of a camera using the 135-type film only achieves a small image plane size for the imaging device compared to the image plane size of the 135-type film (24 mm×36 mm). As a result, a large difference will manifest in the angle of field achieved by a taking lens having a specific focal length, to cause the photographer to feel restricted. This problem becomes eliminated as the image area of the imaging device increases and becomes closer to the image plane size of the 135-type film.

However, as the image area in a single lens reflex type DSC, which forms the primary image with the taking lens at an image device directly, increases, the problems explained below arise to a degree to which they cannot be neglected.

Imaging devices in DSCs in recent years have evolved in two directions, i.e., toward a higher concentration of pixels and toward a larger image plane. When the number of pixels is increased to exceed 1 million pixels while maintaining the size of the image plane at approximately ⅓" to ½" as in the prior art, the pixel pitch becomes reduced. For instance, in an imaging device having approximately 1,300,000 pixels, with its image plane size at approximately ⅓," the pixel pitch is approximately 4 μm. Generally speaking, the pixel pitch "p" at an imaging device and the thickness "t" of the birefringent plates constituting the optical low-pass filter which is employed to support the pixel pitch "p" achieve the relationship expressed through the following equation (1)

$$p = t(ne^2 - no^2)/(2ne \times no) \qquad (1)$$

with t: birefringent plate thickness ne: extraordinary ray refractive index at birefringent plate no: ordinary ray refractive index at birefringent plate When a quartz plate, which is most commonly employed to constitute a birefringent plate, is used in an imaging device with a pixel pitch of approximately 4 μm, the thickness "t" required of the quartz plate is concluded to be approximately 0.7 mm by working backward with "p" in equation (1) set at 4 μm, since the refractive indices of quartz for light having a wavelength of 589 nm are ne=1.55336 and no=1.54425. Since the thickness of the quarter-wave plate needs to be approximately 0.5 mm regardless of the pixel pitch p, the entire thickness achieved when constituting an optical low-pass filter by pasting together three plates, i.e., two quartz plates (birefringent plates) and one quarter-wave plate, will be approximately 2 mm.

However, when the area of the photosensitive surface of an imaging device increases, as in the case of, in particular, an imaging device employed in a single lens reflex type DSC, it becomes necessary to increase the thickness of the optical low-pass filter for the reasons detailed below.

While the size of the image plane of a ⅓ imaging device is approximately 3.6 mm×4.8 mm, let us now consider an imaging device having an image plane size equivalent to that of the C-type (aspect ratio 2:3=16 mm×24 mm) in an IX240 system (advanced photo system (APS)) with silver halide film. When pixels are arrayed at a pixel pitch of approximately 4 μm on this imaging device, the total number of pixels for the entire image plane will exceed 20 million by simple calculation, and it is considered that the current technical level is not high enough to realize such a large number of pixels for practical use from the viewpoints of the yield in imaging device production, the scale and processing speed of the image information processing circuit and the like. As a result, it is assumed that it is appropriate to set the number of pixels at approximately two million and several hundreds of thousands in an imaging device having a large image plane equivalent to that of the APS-C type, which sets the pixel pitch at 10 and several µm.

For instance, when an APS-C size imaging device (16 mm×24 mm) is prepared at a pixel pitch set to 12 µm, the number of pixels in the imaging device will be approximately 2,670,000. When constituting the birefringent plates of the optical low-pass filter employed in combination with the imaging device having the pixel pitch of 12 µm with quartz, the thickness of a single quartz plate is calculated to be "t"=2.04 mm by incorporating "p"=12 µm in equation (1). By adding the thicknesses of two such quartz plates and a quarter-wave plate (0.5 mm), the thickness of the optical low-pass filter is calculated to be 4.58 mm, which is more than twice as large as the thickness of an optical low-pass filter (thickness: 2 mm) with the pixel pitch set at 4 µm.

In addition, since the spectral sensitivity of an imaging device is different from the spectral sensitivity of the human eye, an IR blocking filter is normally provided to cut off infrared light within the imaging optical path in a DSC employing an imaging device. This IR blocking filter (thickness: approximately 0.8 mm) is also provided pasted to the optical low-pass filter. Thus, the entire thickness of the optical low-pass filter supporting the pixel pitch of 12 µm will go up to 5.38 mm when the thickness of the IR blocking filter is included.

It is difficult to place an optical low-pass filter having such a thickness between a taking lens and an imaging device. Even in the case of a regular lens shutter type DSC, which does not require any member to be provided between the rear end of the taking lens and the photosensitive surface of the imaging device except for the optical low-pass filter, it must be ensured in design that the minimum value (the so-called back focal distance) of the distance between the rearmost end of the taking lens and the imaging device is larger than the thickness of the optical low-pass filter. Setting the length of the back focal distance of the taking lens larger than the focal length of the taking lens imposes restrictions in terms of the optical design.

Furthermore, in the case of a single lens reflex type DSC, which directly forms an image of the subject achieved by a taking lens on a large size imaging device without employing a reduction lens system, a quick return mirror for switching the optical path between the viewfinder and the imaging system or a fixed semitransparent mirror (beam splitter) is needed between the taking lens and the imaging device. In addition, a mechanical shutter is required for defining an exposure time and for blocking the imaging device from exposure during an image signal read operation at the imaging device. While this structure having a mirror and a shutter provided between the taking lens and its image forming plane is also adopted in a single lens reflex camera that employs regular silver halide film, it is difficult to provide an optical low-pass filter having a thickness exceeding 5 mm in addition while ensuring that it does not present any obstacle in the operation or the mirror at the shutter. It merits particular note that more and more cameras in recent years adopt the autofocus (AF) function, and that a single lens reflex camera with the AF function adopts a structure having a sub mirror provided to the rear of the quick return mirror, i.e., between the quick return mirror and the shutter, to guide light flux to a focal point detection device. This makes it even more difficult to position an optical low-pass filter having a thickness exceeding 5 mm.

In addition to the problem of an increased thickness of the optical low-pass filter resulting from a larger pixel pitch in a larger imaging device as described above, another problem arises as detailed below.

Normally, the length of the air equivalent optical path achieved when light is transmitted and advances through a medium having a thickness "t" and a refractive index "n" is expressed as t/n. In other words, the air equivalent optical path lengths achieved when light advances through media having the same refractive index "n" but having different thicknesses "t", vary. Now, let us consider light emitted from one point on the optical axis of a photographic optical system toward an imaging device to reach the center of the image plane of the imaging device and light emitted from the same point on the optical axis of the photographic optical system toward the imaging device to reach the periphery of the image plane.

Since the light that reaches the center of the image plane enters the light entry surface of the optical low-pass filter at almost a right angle, "t" roughly equals the thickness of the optical low-pass filter. In contrast, since the light reaching the periphery of the image plane advances diagonally through the optical low-pass filter, "t" here is larger than the "t" encountered by the light reaching the center of the image plane. Since the lengths of the air equivalent optical paths achieved by light being transmitted through the optical low-pass filter are different for the light reaching the center of the image plane and the light reaching the periphery of the image plane as explained above, a focus misalignment occurs in the direction of the optical axis between the image plane center and the image plane periphery. The degree of this focus misalignment increases as the thickness of the optical low-pass filter increases as described above, which may result in a reduced image quality at the peripheral area of the image plane.

As the size of the imaging device is increased, a problem of foreign matter becoming transferred as explained next, i.e., a problem of foreign matter such as dust and lint adhering to the photosensitive surface of the imaging device to cast a shadow onto the image captured by the imaging device, tends to occur readily, in addition to the problems discussed above. In particular, in an interchangeable lens type DSC in which foreign matter such as dust and lint readily enters the mirror box when the taking lens is detached, this problem is more pronounced.

A similar problem occurs in optical devices such as facsimile machines and image scanners when foreign matter such as dust and lint materialize as a document is transmitted or the document read unit moves, which may become adhered to the vicinity of the photosensitive surface of the photoelectric conversion element or the glass (platen glass) upon which the document is placed to result in a shadow being cast on the input image, as in the interchangeable lens type DSC.

Now, since the crystal of quartz employed to constitute birefringent plates imparts a piezoelectric effect, the crystal itself is caused to become electrically charged readily by vibration or the like. The quartz crystal also has a property that does not allow a stored electrical charge to be discharged easily. In addition, since an insulating material such as plastic, ceramic or the like is employed to constitute the imaging device package. The electrical charge stored at the imaging device cannot be released with ease.

Vibration and air currents occurring as a result of an operation of an optical device sometimes cause the foreign matter discussed above to become suspended inside the optical device, which may ultimately become adhered to the electrically charged birefringent plates, imaging device or the like, as explained above. Consequently, the operator of the optical device is required to clean the optical device frequently to prevent shadows from being cast as explained earlier.

SUMMARY OF THE INVENTION

A first object of the present invention is to provide an optical filter achieving a small thickness and an optical device provided with the optical filter.

A second object of the present invention is to provide an optical low-pass filter which is capable of preventing the loss of image quality at the periphery of the image plane even when the image area at the imaging device is expanded or even when the pixel pitch is increased, and an optical device provided with the optical low-pass filter.

A third object of the present invention is to prevent foreign matter from becoming adhered to the optical filter described above, a photoelectric conversion element and the like to cast shadows thereupon, by neutralizing an electrical charge occurring as a result of the optical filter, the photoelectric conversion element and the like becoming electrically charged.

In order to achieve the objects described above, the present invention comprises a first birefringent plate constituting an optical element that spatially divides incident light into two separate light fluxes along a first direction extending perpendicular to the direction in which the incident light advances, a vibrational plane converting plate that changes the vibrational planes of the two light fluxes emitted from the first birefringent plate and a second birefringent plate constituting an optical element that spatially divides each of the two light fluxes emitted from the vibrational plane converting plate into two light fluxes along a second direction that is different from the first direction to achieve a total of four separate light fluxes, with at least either the first birefringent plate or the second birefringent plate, constituted of a material having a larger difference between the extraordinary ray refractive index and the ordinary ray refractive index compared to that of quartz.

In addition, according to the present invention, an anti-reflection coating is applied to a boundary surface of the first birefringent plate and an optical element provided adjacent to the first birefringent plate and a boundary surface of the second birefringent plate and an optical element provided adjacent to the second birefringent plate.

Furthermore, according to the present invention, the vibrational plane converting plate is constituted of a phase plate that is capable of creating a phase difference of a specific quantity between a light component that vibrates in one vibrating direction and a light component that vibrates in another vibrating direction extending perpendicular to the one vibrating direction for each of the two light fluxes emitted from the first birefringent plate.

According to the present invention, the vibrational plane converting plate may be constituted of an optical rotatory plate provided as an optical element that rotates the directions of vibration of the two light fluxes emitted from the first birefringent plate at the vibrational plane by a specific degree.

Alternatively, the present invention comprises a first birefringent plate for spatially dividing light emitted from an image forming lens along a first direction to achieve two separate light fluxes, a phase plate that creates a phase difference of a specific quantity between a light component that vibrates in one vibrating direction and a light component that vibrates in another vibrating direction extending perpendicular to the one vibrating direction for each of the two light fluxes emitted from the first birefringent plate and a second birefringent plate having almost the same thickness and almost the same refractive index as those of the first birefringent plate, provided for spatially dividing each of the two light fluxes emitted from the phase plate along a second direction that is different from the first direction to achieve two separate light fluxes to be guided to the imaging plane of the imaging device, with the thickness t1 and the refractive index n1 of the first birefringent plate and the second birefringent plate satisfying the following conditional equation, with A representing the image height at the image plane corners, PO representing the air equivalent optical path length extending from the imaging plane to the exit pupil of the image forming lens and $A/PO \geq 0.15$ satisfied.

$$t1 \leq C \times \frac{n1}{Y(n1)} \quad (2)$$

with $$Y(n1) = 1 - \frac{\cos\phi}{\cos\theta 1} \quad (3)$$

$$C = \frac{1}{2} \times \left\{ K \times B \times d \times Fno - \left(1 - \frac{\cos\phi}{\cos\theta 2}\right) \times \frac{t2}{n2} \right\} \quad (4)$$

$$\sin\theta 1 = \frac{\sin\phi}{n1} \quad (5)$$

$$\theta 1 = \sin^{-1}\left(\frac{\sin\phi}{n1}\right) \quad (6)$$

$$\theta 2 = \sin^{-1}\left(\frac{n1 \times \sin\phi}{n2}\right) \quad (7)$$

$$0.25 \leq K \leq 0.35 \quad (8)$$

$$1 \leq B \leq 3 \quad (9)$$

t1: thicknesses of the first birefringent plate and the second birefringent plate n1: refractive indices of the first birefringent plate and the second birefringent plate t2: thickness of the phase plate n2: refractive index of phase plate d: pixel pitch at the imaging device φ: Angle of incidence at a first birefringent plate of light flux entering corner of the imaging plane of the imaging device from the center of the exit pupil of the taking lens Fno: F number of the taking lens Alternatively, the present invention may comprise a first birefringent plate for spatially dividing light emitted from an image forming lens along a first direction to achieve two separate light fluxes, a phase plate that creates a phase difference of a specific quantity between a light component that vibrates in one vibrating direction and a light component that vibrates in another vibrating direction extending perpendicular to the one vibrating direction for each of the two light fluxes emitted from the first birefringent plate and a second birefringent plate having almost the same refractive index as that of the first birefringent plate, provided for spatially dividing each of the two light fluxes emitted from the phase plate along a second direction that is different from the first direction to achieve two separate light fluxes to be guided to the imaging plane of the imaging device, with the thickness t11 and the refractive index n1 of the first birefringent plate and the thickness t12 and the refractive index n1 of the second birefringent plate satisfying the following conditional equation, with A representing the image height at the image plane corners, PO representing the air equivalent optical path length extending from the imaging plane to the exit pupil of the image forming lens and A/PO≧0.15 satisfied.

$$t11 + t12 \le C1 \times \frac{n1}{Y(n1)} \quad (10)$$

with $$Y(n1) = 1 - \frac{\cos\phi}{\cos\theta 1} \quad (11)$$

$$C = K \times B \times d \times Fno - \left(1 - \frac{\cos\phi}{\cos\theta 2}\right) \times \frac{t2}{n2} \quad (12)$$

$$\sin\theta 1 = \frac{\sin\phi}{n1} \quad (13)$$

$$\theta 1 = \sin^{-1}\left(\frac{\sin\phi}{n1}\right) \quad (14)$$

$$\theta 2 = \sin^{-1}\left(\frac{n1 \times \sin\phi}{n2}\right) \quad (15)$$

$$0.25 \le K \le 0.35 \quad (16)$$

$$1 \le B \le 3 \quad (17)$$

t11: thickness of the first birefringent plate
t12: thickness of the second birefringent plate
n1: refractive indices of the first birefringent plate and the second birefringent plate
t2: thickness of the phase plate
n2: refractive index of phase plate
d: pixel pitch at the imaging device
φ: Angle of incidence at a first birefringent plate of light flux entering corner of the imaging plane of the imaging device from the center of the exit pupil of the taking lens
Fno: F number of the taking lens Alternatively, the present invention may comprise a first birefringent plate for spatially dividing light emitted from an image forming lens along a first direction to achieve two separate light fluxes, a phase plate that creates a phase difference of a specific quantity between a light component that vibrates in one vibrating direction and a light component that vibrates in another vibrating direction extending perpendicular to the one vibrating direction for each of the two light fluxes emitted from the first birefringent plate and a second birefringent plate having a different thickness and a different refractive index from those of the first birefringent plate, provided for spatially dividing each of the two light fluxes emitted from the phase plate along a second direction that is different from the first direction to achieve two separate light fluxes to be guided to the imaging plane of the imaging device, with the thickness t11 and the refractive index n11 of the first birefringent plate and the thickness t12 and the refractive index n12 of the second birefringent plate satisfying the following conditional equation, with A representing the image height at the image plane corners, PO representing the air equivalent optical path length extending from the imaging plane to the exit pupil of the image forming lens and A/PO≧0.15 satisfied.

$$\left(1 - \frac{\cos\phi}{\cos\theta 1}\right) \times \frac{t11}{n11} + \left(1 - \frac{\cos\phi}{\cos\theta 3}\right) \times \frac{t12}{n12} \le C2 \quad (18)$$

with $$C2 = K \times B \times d \times Fno - \left(1 - \frac{\cos\phi}{\cos\theta 2}\right) \times \frac{t2}{n2} \quad (19)$$

$$\sin\theta 1 = \frac{\sin\phi}{n11} \quad (20)$$

$$\theta 1 = \sin^{-1}\left(\frac{\sin\phi}{n11}\right) \quad (21)$$

$$\theta 2 = \sin^{-1}\left(\frac{n11 \times \sin\theta 1}{n2}\right) \quad (22)$$

$$\theta 3 = \sin^{-1}\left(\frac{n2 \times \sin\theta 2}{n12}\right) \quad (23)$$

$$0.25 \le K \le 0.35 \quad (24)$$

$$1 \le B \le 3 \quad (25)$$

t11: thickness of the first birefringent plate
t12: thickness of the second birefringent plate
n11: refractive index of the first birefringent plate
n12: refractive index of the second birefringent plate
t2: thickness of the phase plate
n2: refractive index of phase plate
d: pixel pitch at the imaging device
φ: Angle of incidence at a first birefringent plate of light flux entering corner of the imaging plane of the imaging device from the center of the exit pupil of the taking lens
Fno: F number of the taking lens The present invention is further provided with a neutralizing circuit for neutralizing electrical charges stored at the first birefringent plate and the second birefringent plate.

In addition, the present invention is provided with a neutralizing circuit for neutralizing at least one of the electrical charges stored at the optical filter, the image forming lens and the imaging device.

The present invention is provided with a photoelectric conversion element for converting an optical image guided to a photosensitive portion of the photoelectric conversion element to an electrical signal, having a cover member covering the photosensitive portion, a transparent electrode formed at a front surface of the cover member and a conductive circuit electrically connected with the transparent electrode and provided to neutralize any electrical charge occurring at the photoelectric conversion element caused by the operation of the electrical system.

Furthermore, the present invention is provided with a photoelectric conversion element for converting an optical image formed by an image forming lens to an electrical signal, an optical member provided in an optical path between the image forming lens and the photoelectric conversion element, a transparent electrode provided, at least, at a surface of an optical member located in the vicinity of the image forming plane of the image forming lens and a conductive member electrically connected with the transparent electrode and provided for neutralizing the electrical charge occurring at the optical member.

The present invention may be further provided with a voltage source that reduces the force with which matter adhering to the photoelectric conversion element by applying a voltage to a conductive member.

The present invention is further provided with a shutter that can be switched between a light blocking state in which a light flux entering the photoelectric conversion element is blocked and an open state in which the light flux is allowed to pass, with the conductive circuit provided to neutralize the electrical charge occurring at the photoelectric conversion element as a result of a shutter operation.

In addition, the present invention may be further provided with a voltage source that reduces the force with which foreign matter adheres to the optical member by applying a voltage to the conductive member.

The present invention is further provided with a control circuit that sustains the open state of the shutter and applies the voltage to the optical member.

DESCRIPTION OF THE PREFERRED EMBODIMENTS

Figure 1:
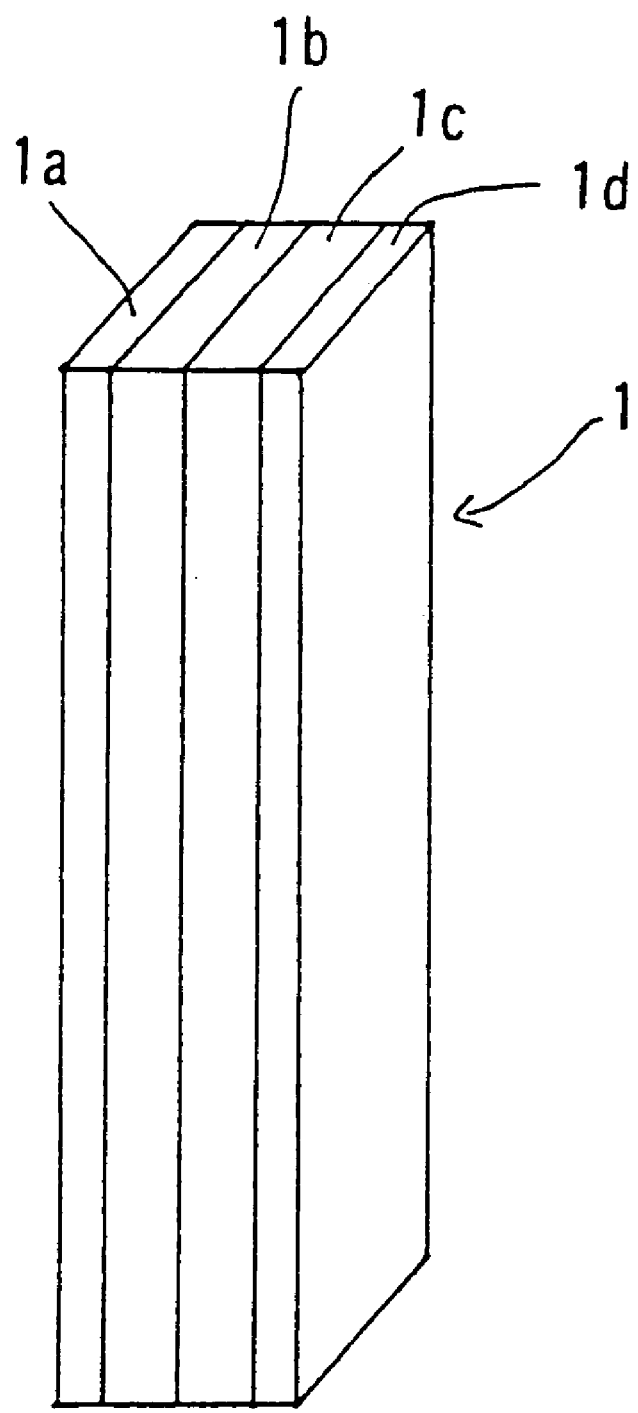
FIG. 1 illustrates the structure of the optical filter according to the present invention.

Advantage of Space Saving Achieved by Reducing the Total Thickness of the Optical Filter FIG. 1 is a perspective illustrating an example of the optical filter according to the present invention. The optical filter 1 in FIG. 1 comprises four main components, i.e., four optical elements each formed in a plate shape, i.e., a first birefringent plate 1a, an IR blocking filter 1b, a phase plate 1c and a second birefringent plate 1d. The first birefringent plate 1a and the second birefringent plate 1d are positioned by ensuring that the direction in which an image shift occurs as a result of the birefringence achieved by the first birefringent plate 1a and the direction in which the image shift occurs as a result of the is birefringence achieved by the second birefringent plate 1d are offset from each other by 90°. The IR blocking filter 1b for cutting off infrared light and the phase plate 1c for converting linearly polarized light to circularly polarized light are provided between the two birefringent plates 1a and 1d. The phase plate 1c may be constituted of, for instance, a quarter-wave plate. It is necessary that the phase plate 1c be provided between the two birefringent plates 1a and 1d in this manner, and in addition, since the IR blocking filter 1b turns milky when it comes in contact with air, it is normally enclosed by substrates to ensure that its surface does not come in contact with air. It is to be noted that while the IR blocking filter 1b may be constituted by vapor-depositing a multilayer film having an IR blocking effect on the surface of a glass substrate, a multilayer film similar to that mentioned above may be provided at a surface of the first birefringent plate 1a or the second birefringent plate 1d, instead. In this case, it is desirable that a protective layer be provided to ensure that the multilayer film does not come in contact with air. By providing a multilayer film at the surface of the first birefringent plate 1a or the second birefringent plate 1d in this manner, the total thickness of the optical filter 1 can be reduced.

Figure 2:
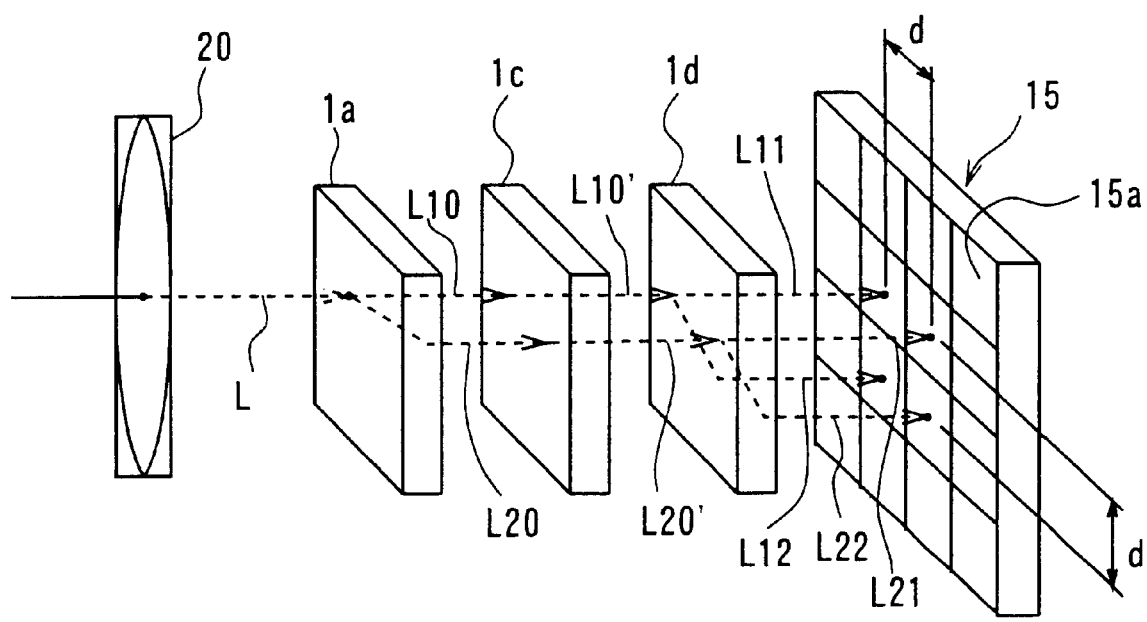
FIG. 2 is a schematic illustration of the structure and the principle of the optical filter according to the present invention.

Next, in reference to FIG. 2, the functions achieved by the optical filter 1 structured as illustrated in FIG. 1 are explained. It is to be noted that in FIG. 2, the IR blocking filter 1b is not shown to achieve simplicity in the explanation and that the first birefringent plate 1a and the phase plate 1c, and the phase plate 1c and the second birefringent plate 1d are shown separate from each other.

When a light ray L that has been transmitted through a taking lens 20 enters the first birefringent plate 1a, it is separated into linear light (an ordinary ray L10) that vibrates in a direction perpendicular to the direction in which the light flux advances and linear light (extraordinary ray L20) that vibrates perpendicular to the ordinary ray L10). Since the first birefringent plate 1a has different refractive indices for the ordinary ray L10 and the extraordinary ray L20, the photographic light ray L that becomes the ordinary ray L10 and the extraordinary ray L20 after entering the birefringent plate 1a travel through two separate optical paths, achieves a double image. In this structure, with the direction in which the extraordinary ray L20 is shifted relative to the ordinary ray L10 (the horizontal direction in the figure) referred to as a first direction, the first birefringent plate 1a can be considered to be an optical element that spatially divides input light along the first direction extending perpendicular to the direction in which the input light flux advances to achieve two separate light fluxes. These two light fluxes, i.e., the ordinary ray L10 and the extraordinary ray L20 are linear light fluxes achieving a light intensity ratio of 1:1 and having polarization planes intersecting each other orthogonally, since the light ray L is natural light.

Next, the ordinary ray L10 and the extraordinary ray L20 enter the phase plate 1c. The phase plate 1c, which is provided to convert linear light to circular light, converts the ordinary ray L10 and the extraordinary ray L20 to circular ray L10' and circular ray L20' respectively with their phases offset from each other by 90°. Since a birefringent plate has an effect on circular light that is similar to its effect on natural light under normal circumstances, the circular ray L10' and the circular ray L20' that have entered the second birefringent plate 1d are respectively divided into an ordinary ray L11 and an extraordinary ray L12 having intensities equal to each other, and into an ordinary ray L21 and an extraordinary ray L22 having intensities equal to each other. The direction in which the extraordinary ray L12 is shifted relative to the ordinary ray L12 and the direction in which the extraordinary ray L22 is shifted relative to the ordinary ray L21 both constitute a second direction extending perpendicular to the first direction discussed earlier (the vertical direction in the figure).

Thus, the photographic light ray L that is originally a single light flux is first separated into the ordinary ray L10 and the extraordinary ray L20 at the first birefringent plate 1a, and then after they are converted to circular light fluxes at the phase plate 1c by changing the vibrational planes of the light fluxes, they are separated into four light fluxes. i.e., the ordinary rays L11 and L21 and the extraordinary rays L12 and L22 at the second birefringent plate 1d. As a result, a quadruple image is formed on an imaging plane 15a of an imaging device 15. Since the first and second birefringent plate 1a and 1d are combined by assuring that the directions in which images are shifted as a result of the birefringence achieved by the two birefringent plates are offset from each other by 90° as explained earlier, the quadruple image on the imaging plane 15a constitutes a near square shape with the individual points achieving equal intensity. When the distance between the individual points, which corresponds to the length of one side of the square shape, is referred to as a separating distance d, the separating distance d is calculated through the following equation (26)

$$d=t(ne^2-no^2)/(2ne \times no) \quad (26)$$

with t: birefringent plate thickness
ne: extraordinary ray refractive index
no: ordinary ray refractive index The optical filter 1 according to the present invention is constituted of the first birefringent plate 1a, the IR blocking filter 1b, the phase plate 1c and the second birefringent plate 1d. While the phase plate 1c is provided between the first birefringent plate 1a and the second birefringent plate 1d in the structure, the position of the IR blocking filter 16 may be set freely. In other words, the IR blocking filter 1b may be provided between the first birefringent plate 1a and the phase plate 1c, as illustrated in FIG. 1, or it may be provided between the phase plate 1c and the second birefringent plate 1d. Alternatively, the IR blocking filter 1b may be provided between a taking lens 20 and the first birefringent plate 1a, or between the second birefringent plate 1d and the imaging plane 15a.

Next, the materials that may be employed to constitute the first birefringent plate 1a and the second birefringent plate 1d constituting the optical filter 1 according to the present invention are explained. Apart from quartz, lithium niobate (LiNbO$_3$) is a substance known as having a birefringent effect. While lithium niobate is employed to constitute a surface acoustic wave filter in communication devices by taking advantage of its property whereby it becomes distorted when a voltage is applied and is also employed to constitute a light guide for laser light by taking advantage of its properties of having a high refractive index and being transparent, there are almost no examples in which its birefringent effect is utilized. However, LiNbO$_3$, which achieves a refractive index ne=2.2238 for extraordinary ray of light having a wavelength of 550 nm and a refractive index no=2.3132 for ordinary ray at a temperature of 25° C. with a larger difference between the extraordinary ray refractive index and the ordinary ray refractive index compared to that of quartz will realize a larger separating distance d compared to that of quartz at the same thickness, when its property of causing birefringence is utilized in an optical filter For instance, in order to achieve a separating distance d of 12 μm, "t" is calculated to be 0.3 mm using equation (26) and the values of the refractive index ne and the refractive index no given above. This amounts to only 15% of 2.04 mm required when quartz is used to constitute the birefringent plates.

Figure 3:
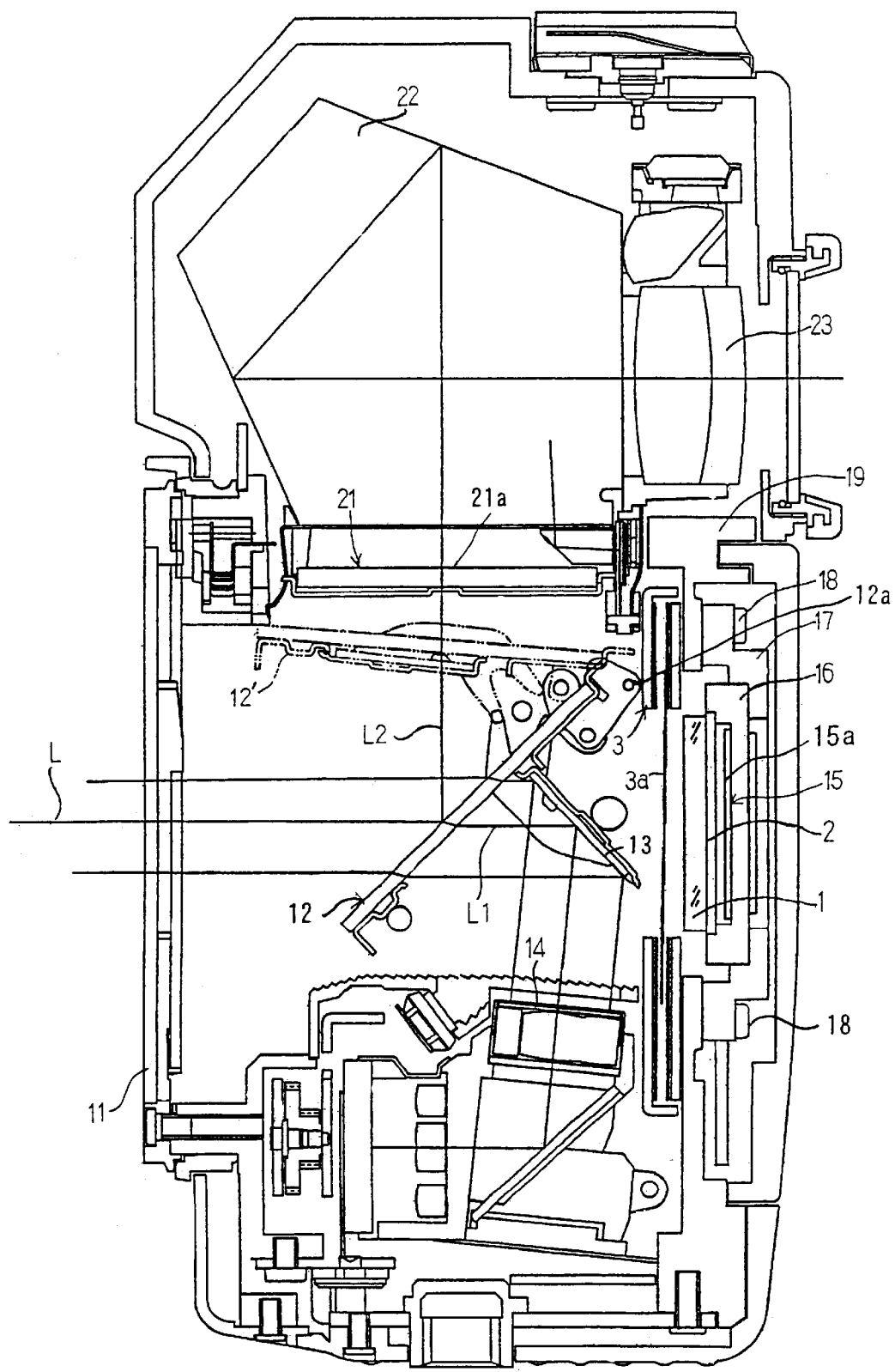
FIG. 3 is a longitudinal sectional view illustrating an example of the structure of a single lens reflex type digital still camera provided with the optical filter according to the present invention.

FIG. 3 illustrates an example in which the optical filter 1 having its birefringent plates constituted of LiNbO$_3$ according to the present invention is mounted in a single lens reflex type digital still camera (DSC). It is to be noted that the figure shows a longitudinal sectional view illustrating the structure of the DSC.

In the DSC in FIG. 3, a mount 11 for mounting an interchangeable taking lens 20 (see FIG. 3) is provided at its front portion (on the left side in the figure) However, FIG. 3 illustrates a state in which the taking lens is removed Subject light L that has been transmitted through the taking lens 20 is separated into transmitted ray L1 for autofocus (AF) and reflected ray L2 for viewfinder monitoring by a semitransparent quick return mirror 12. When the quick return mirror 12 is lowered, i.e., in a viewfinder monitoring state, the transmitted ray L1 is reflected downward in FIG. 3 by a sub mirror 13 provided as part of the quick return mirror 12 to enter a TTL focus detection device 14 provided at the bottom of the mirror box. The TTL focus detection device receives the impinging light through the taking lens, and detects the focal point of the taking lens. The reflected ray L2, on the other hand, forms an image of the subject on a focal plane 21a of a viewing screen 21 provided at a position that is conjugate with the position of the plane of the imaging device 15 (to be detailed later) and this image is enlarged by an ocular 23 via a penta-prism 22 to be monitored.

When a release button (not shown) is pressed, the quick return mirror 12 is caused to swing upward around its pivot portion 12a together with the sub mirror 13, to recede to the position indicated by the 2-point chain line 12' in the figure.

This allows the subject light L that has been transmitted through the taking lens 20 to travel toward the imaging plane 15a (to be detailed later).

An imaging device package 16 is provided at the rear portion of the DSC (on the right side in the figure). The imaging device package 16 is provided with the imaging device 15 and a seal glass 2 that covers the front of the imaging plane 15a of the imaging device 15. The optical filter 1 according to the present invention is provided in close proximity to the front surface of the seal glass 2. The imaging device package 16 is held by a bracket 17. The bracket 17 is secured to the camera main body 19 with screws 18. The bracket 17 and the surface of the camera main body 19 at which the bracket 17 is mounted are machined with a high degree of accuracy so that the imaging plane 15a of the imaging device package 16 is positioned with a high degree of optical accuracy.

A shutter unit 3 is provided between the optical filter 1 and the quick return mirror 12 to block light during an imaging signal read operation (signal brigade operation) at the imaging device 15. FIG. 3 illustrates a state during a signal read following exposure, with a light blocking screen 3a closed. The shutter unit 3 is formed in such a manner that it opens its light blocking screen 3a at a start of imaging device exposure to allow the subject light L to reach the imaging plane 15a.

To explain the thickness of the optical filter 1 by referring to FIG. 1 again, the total of the thicknesses of the four plate-like optical elements 1a, 1b, 1c and 1d constituting the optical filter 1 under normal circumstances will be 1.6–1.9 mm since the thickness of both the first and second birefringent plates 1a and 1d constituted of LiNbO$_3$ is 0.3 mm, the thickness of the phase plate 1c constituted of quartz or the like is approximately 0.5 mm and the thickness of the IR blocking filter 1b is approximately 0.5–0.8 mm with the pixel pitch at the imaging device 15 set at 12 μm, for instance. Even when the total thickness is at its largest at 1.9 mm, it only amounts to 35% of the total thickness 5.38 mm of an optical filter having its first and second birefringent plates 1a and 1b constituted of quartz, to achieve a great advantage in space saving. In particular, since only a limited degree of freedom in design is allowed in regard to the position of the imaging device 15, whose imaging plane 15a must be provided at the image forming plane of the taking lens 20 and, as a result, the space available for providing the shutter unit 3 and the optical filter 1 becomes limited, the advantage of space saving thus achieved in comparison with the space required when the first birefringent plate 1a and the second birefringent plate 1d are constituted of quartz is significant. Most single lens reflex cameras in recent years are provided with an autofocus adjustment mechanism, with the sub mirror 13 provided at the rear of the quick return mirror 12. Thus, there is no large space between the rear end of the sub mirror 13 and the shutter unit 3 or between the rear surface of the shutter unit 3 and the lens image forming plane and, as a result, it is extremely difficult to mount an optical filter having a large thickness of 5.38 mm in a conventional silver halide AF camera structure.

However, the optical filter 1 according to the present invention described above, which saves space, can be mounted in such a structure. Thus, while basically still utilizing the conventional silver halide type single lens reflex camera structure, a DSC employing an imaging device having a large image plane with a pixel pitch exceeding 10 μm can be realized.

It is to be noted that while LiNbO$_3$ constituting the first and second birefringent plates 1a and 1d in the present invention has a cleaving property, this shortcoming can be sufficiently compensated by bonding them together with the phase plate 1c and the like to achieve an integrated unit.

In the optical filter 1 structured as described above, an optical rotatory plate for rotating the plane of polarization of light by 45° may be employed in place of the phase plate 1c. Examples in which an optical rotatory plate is used in an optical filter in the prior art provided with birefringent plates constituted of quartz include that disclosed in Japanese Examined Patent Publication No. 1994-20316 mentioned earlier. According to the present invention, advantages similar to those achieved when the phase plate 1c explained earlier is employed can be realized by adopting a structure in which such an optical rotatory plate is used in combination with the first and second birefringent plates 1a and 1d constituted of LiNbO$_3$. This allows for a greater degree of freedom in regard to the structural features other than the first and second birefringent plates 1a and 1d. Furthermore, it goes without saying that an optical element other than the phase plate 1c or the optical rotatory plate may be employed as long as it provides an effect equivalent to that achieved by the phase plate 1c and the optical rotatory plate.

Figure 4:
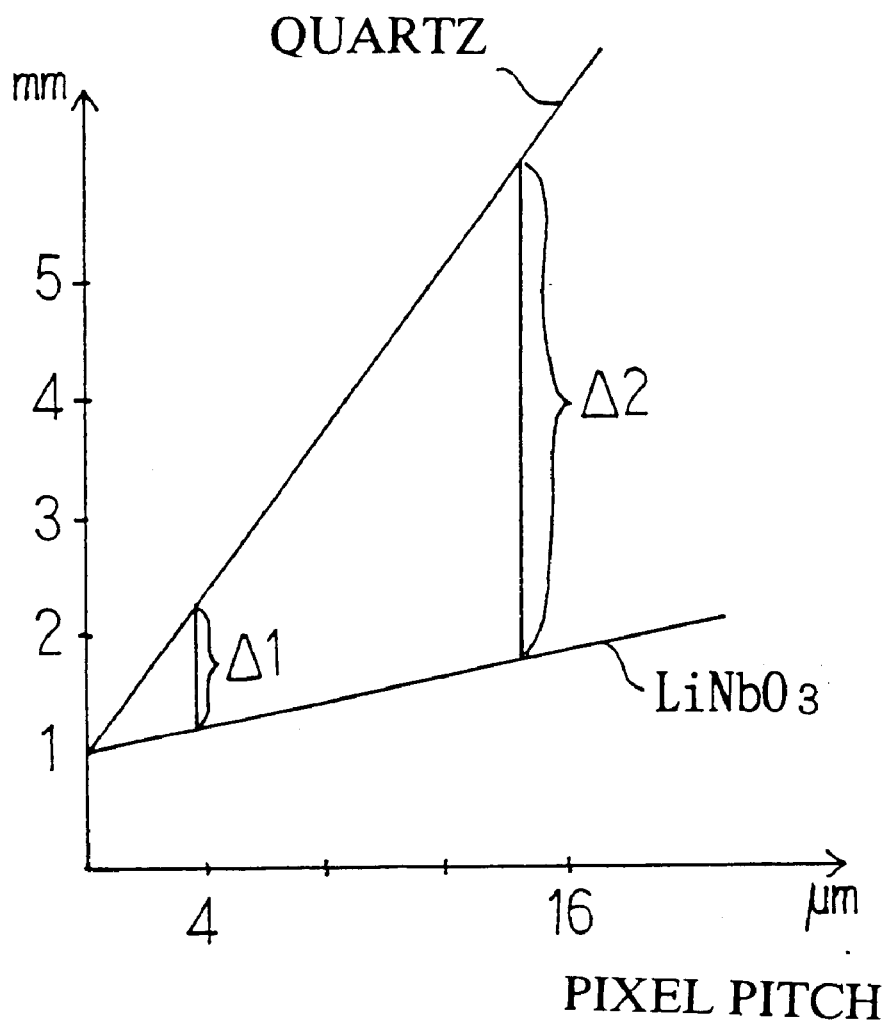
FIG. 4 illustrates the relationship between the thickness of the optical filter and the pixel pitch at the imaging device.

FIG. 4 presents a graph illustrating the relationship between the pixel pitch at the imaging device 15 and the thickness of the optical filter 1 achieved in a structure having its first and second birefringent plates constituted of quartz and that achieved in a structure having its first and second birefringent plates constituted of LiNbO$_3$. With the thicknesses of the members other than the birefringent plates 1a and 1d, i.e., the thickness of the IR blocking filter 1b and the thickness of the phase plate 1c set at 0.6 mm and 0.5 mm respectively and the thickness of the birefringent plates 1a and 1d which is calculated through equation (26) indicated as t, the thickness "t" of the entire optical filter is 1.1+340p (p: pixel pitch at the imaging device) using quartz to constitute the birefringent plates whereas the thickness "t" of the entire optical filter using LiNbO$_3$ to constitute the birefringent plates is 1.1+50.7p. As the pixel pitch "p" increases, the difference between their thicknesses (see Δ1 and Δ2 in FIG. 4) clearly becomes larger. For instance. Δ1 is 1.16 mm with "p" at 4 μm, Δ2 is 4.63 mm with "p" at 16 μm and, thus FIG. 4 demonstrates that the larger the pixel pitch, the larger the space saving advantage achieved by constituting the birefringent plates 1a and 1d with LiNbO$_3$.

It is to be noted that since the refractive index of LiNbO$_3$ greatly differs from those of quartz and the BK7-equivalent glass constituting the IR blocking filter, internal reflection tends to occur more readily at its boundary surfaces compared to a structure achieved by pasting together crystal plates. Since this internal reflection can be prevented by applying an anti-reflection coating to the boundary surface, it is desirable that an anti-reflection coating be applied at the boundary surfaces where the plates are pasted together, as well as at the front surface as in a regular optical filter.

While the explanation has been given thus far on an example in which the optical filter 1 is provided to the rear of the shutter unit 3, now an example in which the position of the optical filter 1 is changed, is explained below in reference to FIG. 5. It is to be noted that in FIG. 5, the same reference numbers are assigned to members and the like with the same structural features and functions as those illustrated in FIG. 3 to preclude the necessity of a repeated explanation thereof.

Figure 5:
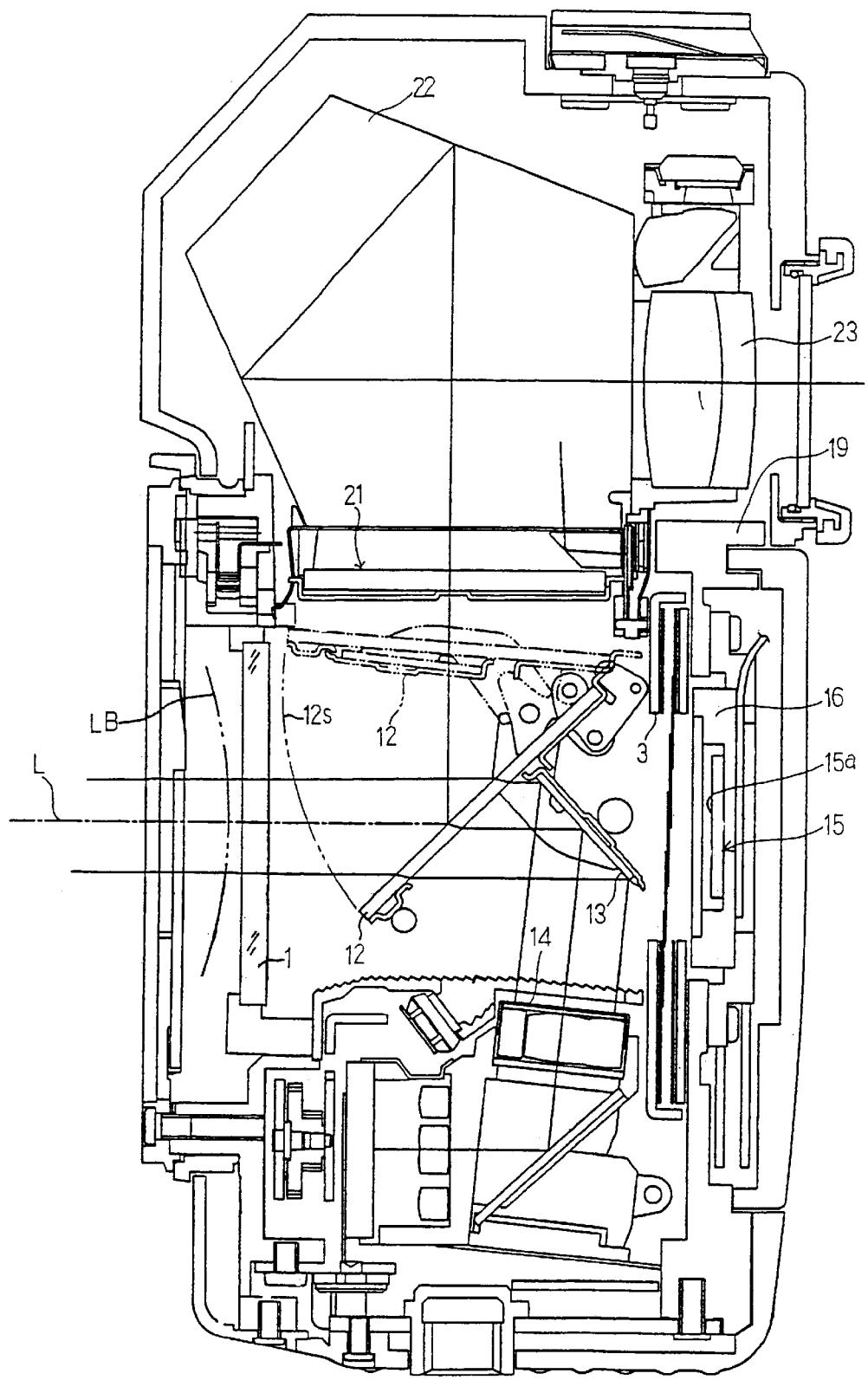
FIG. 5 is a longitudinal sectional view illustrating another example of the structure of a single lens reflex type digital still camera provided with the optical filter according to the present invention.

As illustrated in FIG. 5, a thin optical filter 1 employing LiNbO$_3$ may be provided at the front surface of the quick return mirror 12 in a single lens reflex type DSC. In this case, while the optical filter 1 is still positioned within the optical path (the photographic light flux L) of the taking lens achieving a similar optical effect in a photographing state with the quick return mirror raised (indicated by the 2-point chain line in the figure), the optical filter 1 is present in both the viewfinder monitoring optical path and the AF detection optical path in a viewfinder monitoring state with the quick return mirror 12 lowered (indicated by the solid line and the figure). This is, strictly speaking, not desirable since the effect of the image separation at the optical filter 1 affects the viewfinder image and the AF detection accuracy. However even when there is hardly any gap between the shutter unit 3 and the imaging device 15 and the optical filter cannot be positioned between the shutter unit 3 and the imaging device 15 even with the space saving effect achieved through the use of LiNbO$_3$, the optical filter can be mounted between a locus 12s at the front end of the quick return mirror 12 during its operation and a trailing end LB of the taking lens by reducing the radius of the locus 12s at the front end of the quick return mirror 12 compared to that in a single lens reflex type camera using the 135-type photographic film. If the size of the imaging device is smaller (e.g., the APS size) than the image plane size of the 135-type photographic film, the size of the quick return mirror 12 can be also reduced correspondingly compared to the size of the quick return mirror in a camera that employs the 135-type photographic film. Thus, the space for accommodating the thin optical filter 1 constituted by using LibO$_3$ is assured by the reduced radius of the locus 12s at the front end of the quick return mirror 12.

While the explanation has been given thus far on an example in which both the first and second birefringent plates 1a and 1d in the optical filter 1 are constituted of LiNbO$_3$, a corresponding degree of space saving effect can be achieved by forming one of the two birefringent plates 1a and 1b with LiNbO$_3$ and forming the other birefringent plate with, for instance, quartz. In other words, the technical scope of the present invention includes a structure achieved by constituting only one of the two birefringent plates 1a and 1d with LiNbO$_3$, as well as a structure which is achieved by constituting both the birefringent plates 1a and 1d with LiNbO$_3$.

Improvement in the Optical Performance Achieved by Reducing the Total Thickness of the Optical Filter As explained above, by constituting at least either the first or second birefringent plate 1a or 1d in the optical filter 1 with LiNbO$_3$, the total thickness of the optical filter 1 can be reduced. In addition to the advantage explained earlier, the optical filter 1 according to the present invention achieves an advantage of reducing the focus misalignment occurring in the direction of the optical axis between the central area of the image plane and the periphery of the image plane as explained below.

Figure 6:
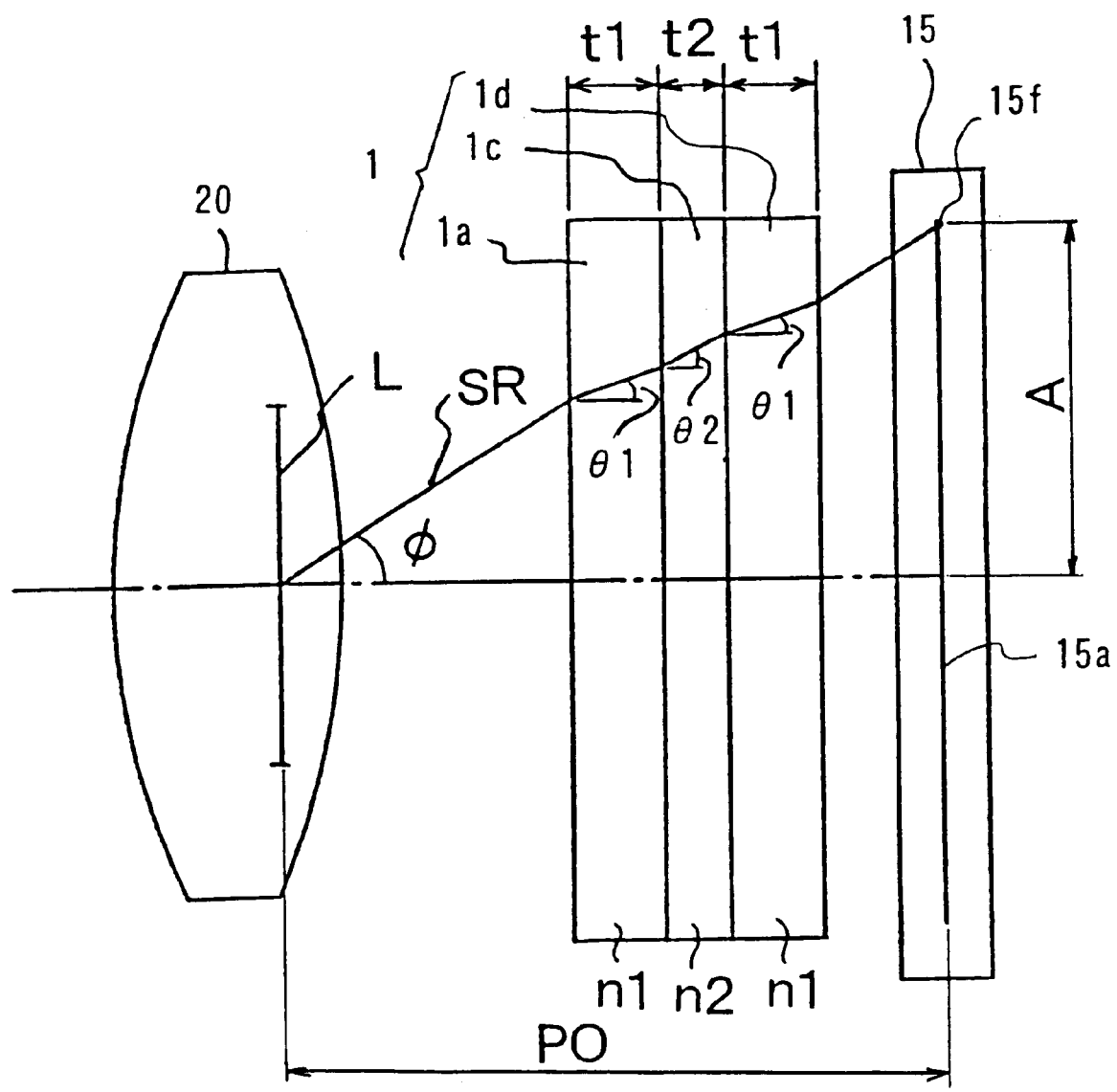
FIG. 6 presents a schematic structure of the optical filter in an embodiment of the present invention, illustrating an example of the combination of two birefringent plates having equal thicknesses and refractive indices.

FIG. 6 schematically illustrates the structure in which the optical filter 1 is provided between the taking lens 20 and the imaging device 15 inside the single lens reflex type DSC illustrated in FIG. 3 or FIG. 5. It is to be noted that the illustration of the IR blocking filter 1b is omitted in FIG. 6. In the optical filter 1 in FIG. 6, the thickness of the first birefringent plate 1a and the thickness of the second birefringent plate 1d are equal to each other at t1. The thickness of the phase plate 1c is t2. In addition, the refractive index of the first birefringent plate 1a and the second birefringent plate 1d is n1, whereas the refractive index of the phase plate 1d is n2. A CCD, a MOS type image sensor or the like is employed to constitute the imaging device 15.

Now, a general principle is discussed in regard to the total thickness of an optical filter in reference to a comparison of an optical filter used in combination with an imaging device having a ⅔" image area size and approximately 1.3 million pixels and an optical filter used in combination with an imaging device having a 15.5 mm×22.8 mm image area size and approximately 2 million pixels. Then, optical problems occurring as a result of an increase in the thickness of the optical filter are explained.

At an imaging device having image plane size of approximately ⅔ and approximately 1.3 million pixels, the pixel pitch will be approximately 6.6 μm. The thickness "t" required to achieve a separating distance for the image corresponding to this level of pixel pitch by using quartz, the most common material, to constitute the birefringent plates is calculated as follows. Quartz has the following refractive indices for light having a wavelength of 589 nm.

ne=1.55336 no=1.54425

The thickness "t" for each birefringent plate is calculated to be approximately 1.12 mm by performing the reverse calculation using equation (26) with d set at 6.6 μm. As already explained, since the thickness of the phase plate needs to be approximately 0.5 mm regardless of what the separating distance is, the thickness of the optical filter constituted by pasting together the three plates in this case will be approximately 2.74 mm.

Now, an imaging device having an image area of approximately 15.5 mm×22.8 mm having approximately 2 million pixels, which is comparable to the C-type in the IX240 system will have a pixel pitch of approximately 13.2 μm. The thickness "t" required for achieving a separating distance for the image corresponding to the pixel pitch of 13.2 μm when constituting the birefringent plates with quartz, as in the example featuring the ⅔" imaging device, is calculated to be "t"=2.25 mm by performing reverse calculation using equation (26) with d set at 13.2 μm. The total thickness of the optical filter is calculated to be approximately 5 mm by adding the thickness of the two birefringent plates and the thickness 0.5 mm of the phase plate, which shows an approximately 82% increase over the thickness of the optical filter having a pixel pitch of 6.6 μm. When the thickness 0.5 mm of the IR blocking filter is added, the optical filter supporting the pixel pitch of 13.2 μm will have a large thickness of 5.5 mm adding together the thicknesses of the four elements including that of the IR blocking filter.

Figure 7:
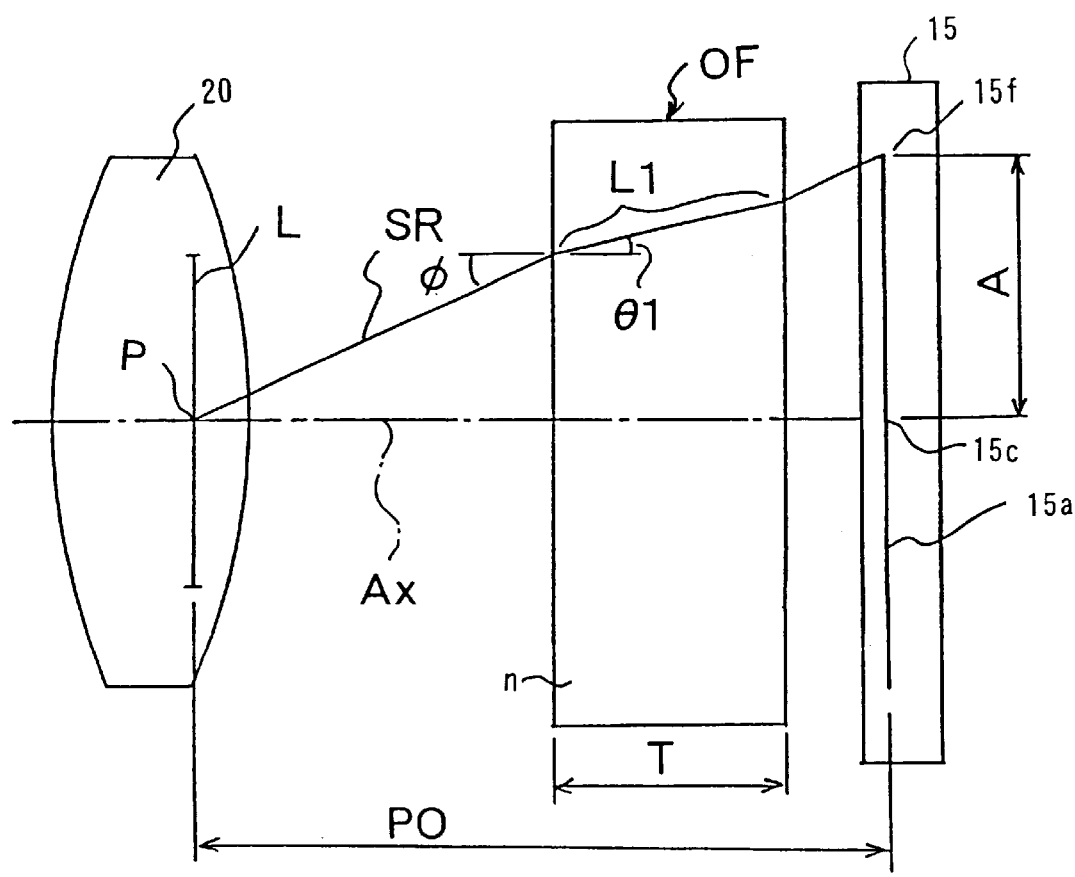
FIG. 7 illustrates focus misalignment caused by an optical low-pass filter.

The reason for focus misalignment occurring in the direction of the optical axis between the central area of the image plane and the periphery of the image plane as the thickness of the optical filter increases in this manner is explained in reference to FIG. 7.

For the purpose of simplifying the explanation, it is assumed that an optical filter OF having a total thickness "t" which is provided between the taking lens 20 and the imaging device 15 has a uniform refractive index n. By providing the optical filter OF between the taking lens 20 and the imaging device 15, the air equivalent optical path length between the lens 20 and the imaging plane 15a of the imaging device 15 changes as expressed in the following equation (27) relative to a structure with no optical filter OF present.

$$\Delta 1 = t \times \left(1 - \frac{1}{n}\right) \quad (27)$$

The change quantity Δ1 in the air equivalent optical path length expressed through equation (27) relates to a beam of light advancing on the optical axis Ax of the taking lens 20 and is achieved only when the light flux enters the optical filter OF perpendicularly. The angle of incidence φ of the light flux entering the filter OF after passing through the center "P" of the exit pupil L of the lens 20 is at its largest when the light flux SR enters an off-axis corner 15*f* of the imaging plane 15*a* of the imaging device 15. With θ1 representing the refractive angle of the light flux SR after it enters the optical filter OF and L1 representing the optical path length of the light flux SR within the optical filter OF, the change quantity Δ3 of the air equivalent optical path length along the direction in which the light flux SR advances is calculated through the following equation (28). Then, based upon equation (28) the change quantity Δ2 of the air equivalent optical path length in the direction of the optical axis is calculated through the following equation (29).

$$\Delta 3 = \frac{t}{\cos\phi} - \frac{L1}{n} = \frac{t}{\cos\phi} - \frac{t}{n \times \cos\theta 1} \quad (28)$$
$$= t \times \left(\frac{1}{\cos\phi} - \frac{1}{n \times \cos\theta 1}\right)$$

$$\Delta 2 = \Delta 3 \times \cos\phi = t \times \left(1 - \frac{\cos\phi}{n \times \cos\theta 1}\right) \quad (29)$$

Equation (27) and equation (29) indicate that a difference Δ2−Δ1 as expressed through the following equation (30) is formed in the change quantity of the air equivalent optical path length between the light flux reaching the center 15*c* of the imaging plane 15*a* of the imaging device 15 and the light flux reaching the diagonal corner 15*f*. This difference causes a focus misalignment occurring between the image plane center and the image plane periphery, resulting in the image forming plane of the taking lens 20 becoming non-planar. As a result, as the difference Δ2−Δ1 increases, the quality of image at the periphery of the image plane deteriorates.

$$\Delta 2 - \Delta 1 = \frac{t}{n} \times \left(1 - \frac{\cos\phi}{\cos\theta 1}\right) \quad (30)$$

As equation (30) clearly indicates, since it can be assumed that θ1≈φ even in the case of a light flux entering a diagonal corner 35*a* of the image plane as long as the angle of incidence of the light flux at the optical filter OF is not excessively large, the difference Δ2−Δ1 can be considered to be 0.

The following two conditions must be satisfied to ensure that the angle of incidence at the optical filter OF of a light flux entering a diagonal corner of an image plane does not become excessively large. Specifically, the first condition is that the distance (PO) between the exit pupil L of the taking lens 20 and the imaging plane 15*a* is large. The second condition is that the image area of the imaging device 15 be small, i.e., that the area of the imaging plane 15*a* be small with a small distance "A" achieved between the image plane center 15*c* and the diagonal corner 15*f* of the image plane.

Since interchangeable lenses used in a camera employing the 135-type photographic film can be often directly utilized in a single lens reflex type DSC, the lenses utilized in such a DSC may have a relatively short PO of approximately 50 mm. The difference Δ2−Δ1 explained above manifesting when the imaging size of the imaging device is, for instance, 24 mm×16 mm (aspect ratio; 3:2) and the pixel pitch is 13.2 mm and a taking lens 20 with a PO of 50 mm is mounted, is now calculated.

When the thickness of the optical filter OF is assumed to be 5 mm (the pixel pitch at 3.2 μm, includes the thickness 0.5 mm of the phase plate) and "n"=1.54 (quartz), the image height at the image plane is calculated to be 14.4 mm with the angle of incidence φ at the optical filter OF at 16.1°. Based upon the law of refraction, θ1 is calculated to be 10.4°, and based upon equation (30), the focus misalignment quantity Δ2−Δ1 at the image plane center 15*c* and the diagonal corner 15*f* of the image plane is calculated to be approximately 75 μm.

When the results of the calculation performed above are compared with those achieved by an optical filter employed in combination with an imaging device in the ⅔, size (the image height 5.6 mm at the corner, the pixel pitch at 6.6 μm) described earlier and a lens with PO set at 100 mm, θ1 is calculated to be 2.1° based upon the angle of incidence φ=3.2°. Since the pixel pitch of the ⅔, size imaging device is 6.6 μm and the thickness of the optical filter OF (n=1.54) is calculated to be approximately 2.7 mm (includes the thickness of the phase plate), the focus misalignment quantity Δ2−Δ1 at the diagonal corner of the image plane in this case is calculated to be approximately 1.6 μm, which is only 2% of 75 μm.

Now, when discussing the depth of focus achieved by imaging with an imaging device, the setting of the allowable diameter of the circle of confusion which constitutes a premise for the discussion, i.e., the setting of the allowable circle of confusion diameter, is an issue to be addressed. There is a theory that the allowable circle of confusion diameter should be set to approximately 33 μm (=1/30 mm) with the 135-type (35 mm full size) photographic film. At the same time, while there are various theories in regard to how the allowable circle of confusion diameter should be set when imaging in performed with an imaging device, they all fall within a range of 1 time to approximately 3 times the pixel pitch of the imaging device. In this discussion we shall assume the allowable circle of confusion diameter is twice the pixel pitch.

The depth of focus is calculated as the product of aperture value setting at the taking lens and the allowable circle of confusion diameter. Thus, the depth of focus achieved when the aperture value setting at the taking lens is F2.8 and the pixel pitch is 13.2 μm is calculated to be 2.8×13.2 μm×2=74 μm. In addition, the depth of focus achieved when the aperture value setting at the taking lens is F 2.8 and the pixel pitch is 6.6 μm is calculated to be 2.8×6.6 μm×2=36 μm. While a focus misalignment of 1.6 μm relative to the depth of focus of 36 μm does not present any problem whatsoever, a focus misalignment of 75 μm relative to the depth of focus of 74 μm poses a serious problem. Even if the focal point matches perfectly without any error at the center of the image plane, the focus misalignment attributable to the thickness of the optical filter OF already exceeds the depth of focus at the corners of the image plane, and if we also take into consideration error factors in regard to the focal point matching at the center of the image plane (positioning adjustment accuracy at the imaging plane, lens focusing error and the like), there will be no room for allowance for error factors left for the image at the corners of the image plane.

Figure 8:
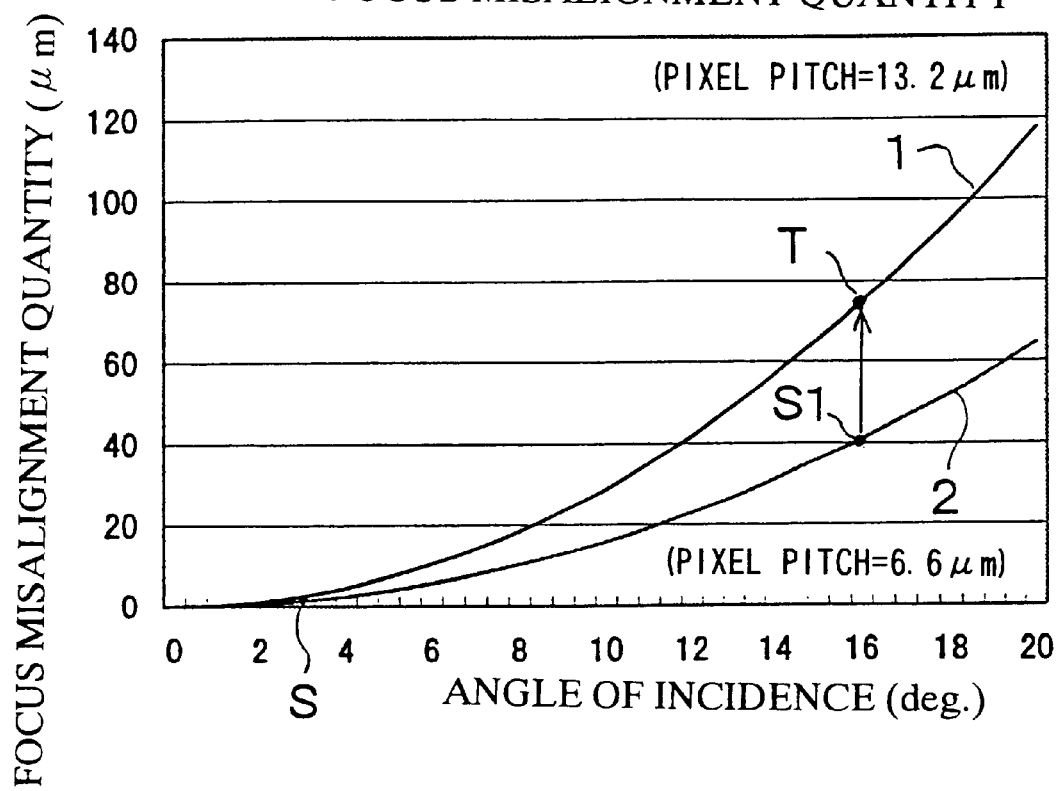
FIG. 8 illustrates the relationship between the angle of incidence of a ray of light entering the optical low-pass filter and the focus misalignment quantity.

FIG. 8 presents a graph illustrating the relationship between the angle of incidence of a light flux at an optical filter and the focus misalignment quantity discussed above with the thickness of the optical filter is as a parameter. In the graph in FIG. 8, a curve 1 represents the change in the focus misalignment quantity observed when a relatively thick optical filter employing quartz birefringent plates is used to support an imaging device having a pixel pitch of 13.2 μm, whereas curve 2 represents change in the focus misalignment quantity observed when a relatively thin optical filter employing quartz birefringent plates is used to support an imaging device having a pixel pitch of 6.6 μm. Point "T" indicates the results achieved when PO=50 mm, the pixel pitch is 13.2 μm and the image height at the corner is 14.4 mm, whereas point "S" indicates the results achieved when PO=100 mm, the pixel pitch is 6.6 μm and the image height at the corner is 5.6 mm.

When the imaging device having a pixel pitch of 6.6 μm is enlarged to achieve the dimensions 24 mm×16 mm, the focus misalignment quantity at the corners of the image plane increase diagonally upward to the right along the curve 2 from the point "s" to reach the value indicated by point "S1" with the angle of incidence at 16.1°. However, in a larger imaging device, the pixel pitch is also set larger in consideration of the comparative merits achieved by an increase in the number of pixels relative to the production yield and also in order to improve the sensitivity. As a result, the thickness of the optical filter constituted by using quartz must be increased in correspondence.

Due to this increase in the thickness of the optical filter, the focus misalignment quantity further increases upward from the point "S1" on the curve 2 until the focus misalignment quantity is at the point "T" on the curve 1 in the case of the imaging device having a pixel pitch of 13.2 μm. The focus misalignment quantity at the corners of the image plane increases markedly in an imaging device having a large image area in this manner, since the increase in the angle of incidence at the filter of light entering the corners of the image plane at the filter and the increase in the pixel pitch resulting in an increase in the filter thickness are factors which together introduce a greater effect than any one of them alone.

Figure 9:
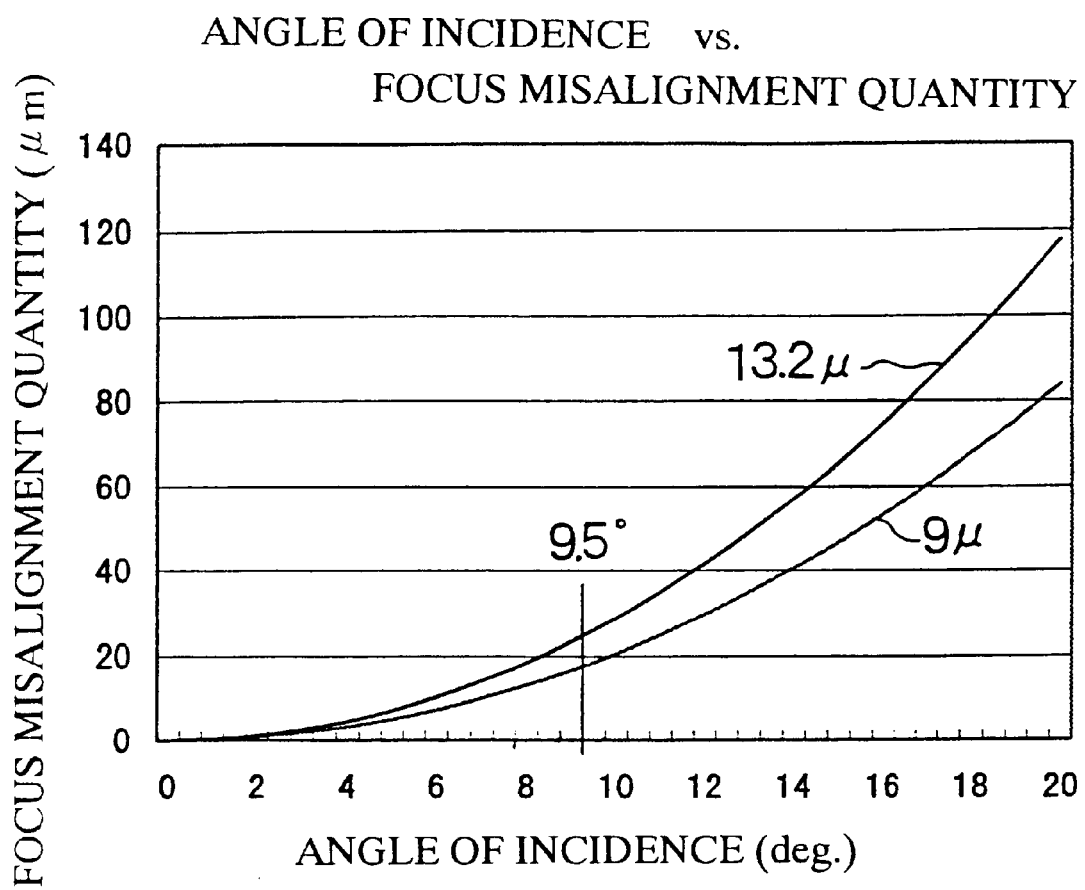
FIG. 9 illustrates the relationship between the angle of incidence of a ray of light entering the optical low-pass filter and the focus misalignment quantity.

FIG. 9 presents a graph similar to that presented in FIG. 8. In FIG. 9, a curve representing the change in the focus misalignment quantity observed when an optical filter employing quartz birefringent plates is used to support an imaging device having a pixel pitch of 13.2 μm and a curve representing the change in focus misalignment quantity observed when an optical filter employing quartz birefringent plates is used to support an imaging device having a pixel pitch of 9 μm are presented.

Now, let us assume that the allowable value for the focus misalignment described above is ⅓ of the depth of focus. When the aperture value setting at the taking lens is at F 2.8, the depth of focus is calculated as 2.8×pixel pitch×2. Using the pixel pitch, the allowable value for the focus misalignment is expressed as 2.8×pixel pitch×2÷3=1.9×pixel pitch. FIG. 9 indicates that the 1.9×pixel pitch focus misalignment (25.1 μm with a pixel pitch of 13.2 μm and 17.1 μm with a pixel pitch of 9 μm) occurs when the angle of incidence is approximately 9.5°, it is indicated that since TAN 9°=0.158, a filter that takes into consideration the focus misalignment occurring at the corners of the image plane when there is a possible combination of "PO", and the image height at the corner "A" that results in TAN φ exceeding TAN φ=A/PO≧0.15 must be achieved.

Now, an explanation is given in regard to how the focus misalignment described above is reduced by employing the optical filter 1 in the embodiment of the present invention, again in reference to FIG. 6. As illustrated in FIG. 6, the light flux SR travels through the center of the exit pupil L of the taking lens 20 to enter the corner 15f along the diagonal of the imaging plane 15a, and O1 represents the refractive angle of the light flux SR after it enters the first birefringent plate 1a (since the first birefringent plate 1a and the second birefringent plate 1d have the same refractive index, the refractive angle of the light flux SR after it enters the second birefringent plate 1d, too, is referred to as θ1). Likewise, the refractive angle of the light flux SR after it enters the phase plate 1c is indicated as θ2. In addition, n1 represents the refractive index of the first birefringent plate 1a and the second birefringent plate 1d, and n2 represents the refractive index of the phase plate 1c.

Based upon equation (30), the individual focus misalignment quantities at the corners of the image plain occurring as a result of the light being transmitted through the first birefringent plate 1a, the phase plate 1c and the second birefringent plate 1d, are calculated, with the focus misalignment quantities corresponding to the birefringent plates 1a and 1d calculated by using the following equation (31) and the focus misalignment quantity corresponding to the phase plate 1c calculated by using the following equation (32) respectively. The focus misalignment quantity Δa occurring at the corners of the image plane attributable to the entire optical filter 1 is the total of the individual focus misalignment quantities, which may be calculated through the following equation (33).

$$\text{focus misalignment quantity} \atop \text{(birefringent plate)} \quad \Delta r = \frac{t1}{n1} \times \left(1 - \frac{\cos\phi}{\cos\theta 1}\right) \quad (31)$$

$$\text{focus misalignment quantity} \atop \text{(phase plate)} \quad \Delta p = \frac{t2}{n2} \times \left(1 - \frac{\cos\phi}{\cos\theta 2}\right) \quad (32)$$

$$\Delta a = 2 \times \Delta r + \Delta p \quad (33)$$

The concept of the allowance for the focus misalignment quantity at the corners of the image plane is explained again. At the focus position at the center of the image plane (=on the lens optical axis), there is almost always a focusing error (the range finding error and the lens stop position accuracy error attributable to autofocus, or focusing error in manual range finding), and it is also difficult to achieve zero error for the mechanical accuracy with respect to the image plane position of the camera itself. Thus, these errors must be ultimately covered with the depth of focus at the image plane (=product of the aperture value setting at the taking lens and the allowable circle of confusion diameter). As a result, the allowable value for the focus misalignment quantity cannot be set equal to the depth of focus, and it must be ensured that the allowable value for the focus misalignment quantity must be set equal to or less than a factor K (K<1) of the depth of focus. By taking into consideration the deviation factor of the focusing accuracy described above at the center of the image plane, a value that is approximately ¼–⅓ (0.25≦K≦0.35) of the depth of focus may be regarded as reasonable.

At the same time, since there are various theories in regard to the length of the allowable circle of confusion diameter relative to the pixel pitch at the imaging plane of an imaging device, all of which fall within the range of approximately 1–3 times the pixel pitch, as explained earlier, the allowable circle of confusion diameter is expressed as B×d (1≦B≦3, d: pixel pitch).

With Fno representing the aperture value setting at the taking lens 20, the relationship described above is numerically expressed through equation (34).

$$2 \times \frac{t1}{n1} \times \left(1 - \frac{\cos\phi}{\cos\theta 1}\right) + \frac{t2}{n2} \times \left(1 - \frac{\cos\phi}{\cos\theta 2}\right) \leq K \times B \times d \times Fno \quad (34)$$

$$(0.25 \leq K \leq 0.35, 1 \leq B \leq 3)$$

By fixing the distance from the exit pupil L of the taking lens 20 to the imaging plane 15a and the image area size of the imaging device 15 at constant values and by constituting the phase plate with a specific material to a specific thickness (e.g., using quartz which is a common material for this application, to achieve a thickness of approximately 0.5 mm), constants, i.e., n2=1.54, θ2=10.4° and t2=0.5, are achieved. In addition, since φ, too, achieves a constant value, the second term in the left side member of equation (34) becomes a constant. Thus, θ1 can be expressed as a function of n1 so that equation (34) is re-expressed with the following equation (35).

$$t1 \leq C \times \frac{n1}{Y(n1)} \tag{35}$$

with $$Y(n1) = 1 - \frac{\cos\phi}{\cos\theta 1} \tag{36}$$

$$C = \frac{1}{2} \times \left\{ K \times B \times d \times Fno - \left(1 - \frac{\cos\phi}{\cos\theta 2}\right) \times \frac{t2}{n2} \right\} = const. \tag{37}$$

$$\sin\theta 1 = \frac{\sin\phi}{n1} \tag{38}$$

$$\theta 1 = \sin^{-1}\left(\frac{\sin\phi}{n1}\right) \tag{39}$$

$$\theta 2 = \sin^{-1}\left(\frac{n1 \times \sin\phi}{n2}\right) \tag{40}$$

Now, let us consider a case in which the image height is 14.4 mm (a diagonal of 24 mm×16 mm), the air equivalent optical path length from the image plane to the exit pupil of the lens is 50 mm, K=0.3, B=3, d=12 μm and Fno=2.8. Y(n1) and C are calculated using the following equations (41) and (42) with the angle of the incidence φ at the filter at 16.1° and θ2 at 10.4°.

$$Y(n1) = 1 - \frac{0.9608}{\cos\{\sin^{-1}(0.2773/n1)\}} \tag{41}$$

$$C = 0.006318 \tag{42}$$

Figure 10:
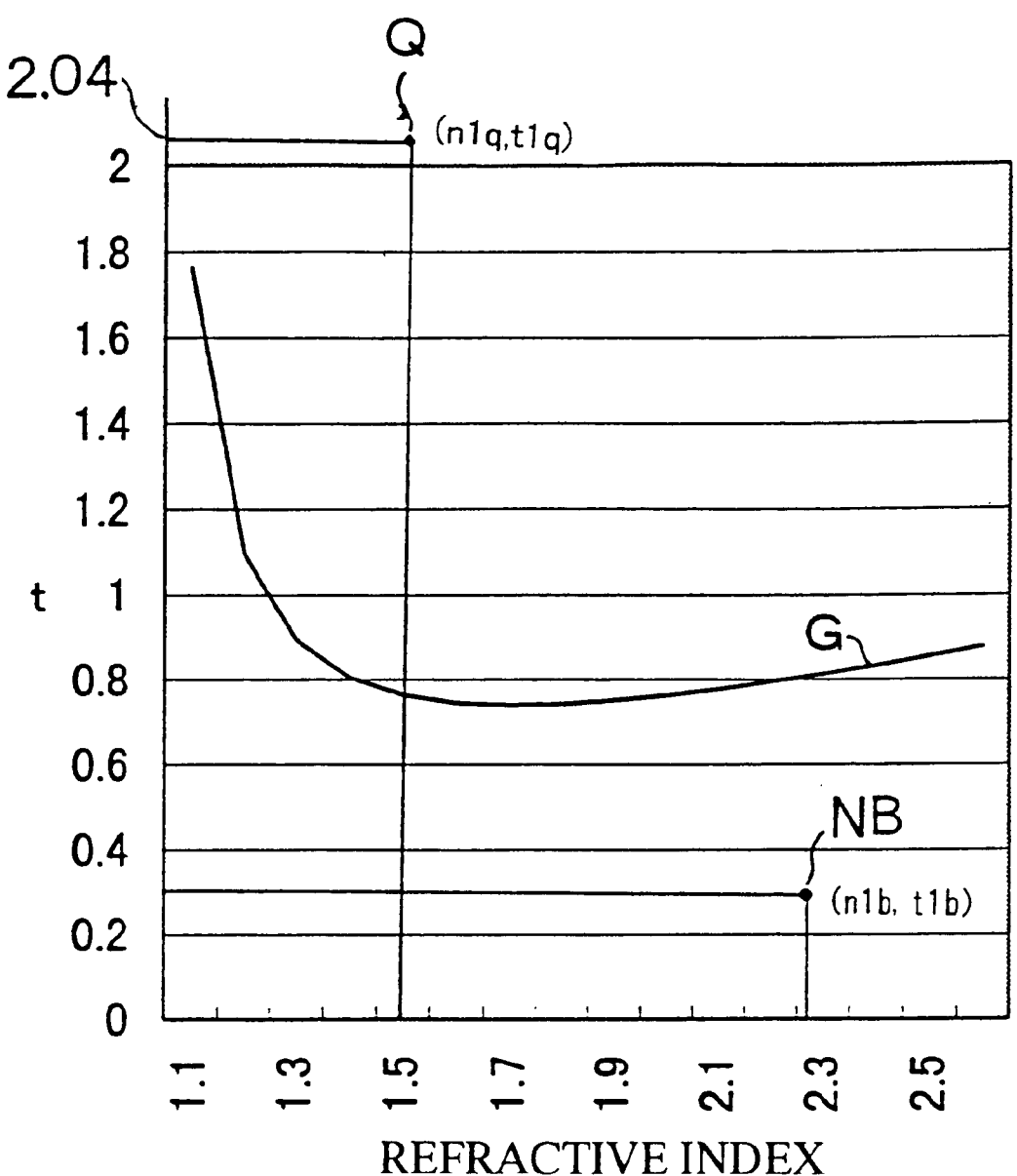
FIG. 10 illustrates a method for selecting the combination of the refractive indices and the thicknesses of the birefringent plates.

By rendering in a graph the relationship expressed in equation (35) with these values incorporated, the horizontal axis representing n1 and the vertical axis representing t1, a curve G in FIG. 10 is achieved. The combination of t1 and n1 that satisfies the inequality expressed in equation (35) is present in the range that is lower than the curve G in FIG. 10. By making an appropriate selection for the material to constitute the first birefringent plate 1*a* and the second birefringent plate 1*d* to ensure that the combination of the refractive index n1 and the thickness t1 described above is achieved, the focus misalignment quantity at the corners of the image plane is set to be equal to or lower than a specific value (the allowable value set by selecting the values for B and K). For instance, let us consider a case in which quartz is used to constitute the first birefringent plate 1*a* and the second birefringent plate 1*d*. t1*q* representing the thickness achieved by constituting the first birefringent plate 1*a* and the second birefringent plate 1*d* of quartz is calculated to be t1*q*=2.04 mm by performing reverse calculation using equation (26) with d=12 μm. Since the refractive index n1*q* of quartz is 1.54, the coordinates (n1*q*, t1*q*) in the graph in FIG. 10 correspond to the position of point Q, thereby demonstrating that the focus misalignment quantity at the corners of the image plane is not set to be equal to or less than the allowable value.

Now, let us consider a case in which lithium niobate (LiNbO₃), which is known as a material having a birefringent effect comparable to that achieved by quartz, is used to constitute the first birefringent plate 1*a* and the second birefringent plate 1*d*. The extraordinary ray refractive index ne and the ordinary ray refractive index no of lithium niobate are ne=2.2238 and no=2.3132(=n1*b*) respectively. t1*b* representing the thickness of the birefringent plates 1*a* and 1*d* with lithium niobate is calculated to be t1*b*=0.3 mm by incorporating d=12 μm and the value of ne and no above in equation (26).

The position of the coordinates (n1*b*, t1*b*) is indicated at point NB in the graph in FIG. 10. The point NB is located in the range lower than the curve G, demonstrating that the focus misalignment easily stays within the allowable value.

Figure 11:
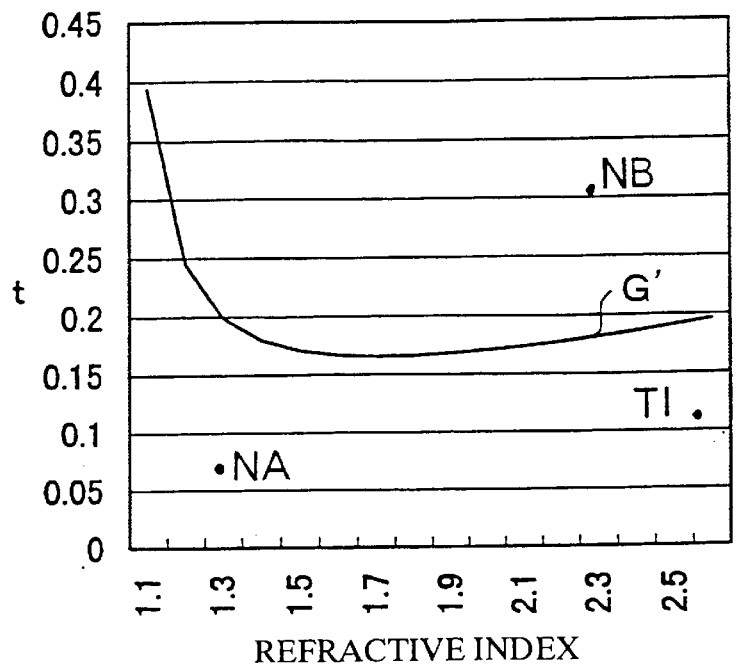
FIG. 11 illustrates another method for selecting the combination of the refractive indices and the thicknesses of the birefringent plates.

Next, FIG. 11 presents a graph with K=0.25 and B=1.5 adopting more rigorous criteria for evaluation. By these criteria for evaluation, the point NB achieved by using lithium niobate to constitute the birefringent plates 1*a* and 1*d* is located in the range above the curve G', and the focus misalignment quantity is no longer equal to or less than the allowable value. It is understood that in this case, a focus misalignment quantity equal to or less than the allowable value is achieved by using Chilean nitrate (NaNO₃, ne=1.34, no=1.60) indicated by a point NA or rutile (TiO₂, ne=2.9, no=2.61) indicated by a point TI in FIG. 11 to constitute the birefringent plates 1*a* and 1*d*.

The level of rigor for the evaluation criteria is set depending upon the selected values for K and B, the F-number and the position of the exit pupil of a taking lens that can be mounted, and the required image distance over which focusing should be assured. In a camera that does not allow lens exchange, the open F-number of the lens is naturally selected for the F-number, whereas in an interchangeable lens type camera, the open F-number of the lens achieving the brightest open F-number among lenses that may be mounted is selected for the F-number, under normal circumstances. The same principle applies to the position of the exit pupil. In addition, K and B are set within the setting ranges explained earlier, in reference to the overall target performance level and the like of the electronic camera in which the optical filter is mounted.

Figure 12:
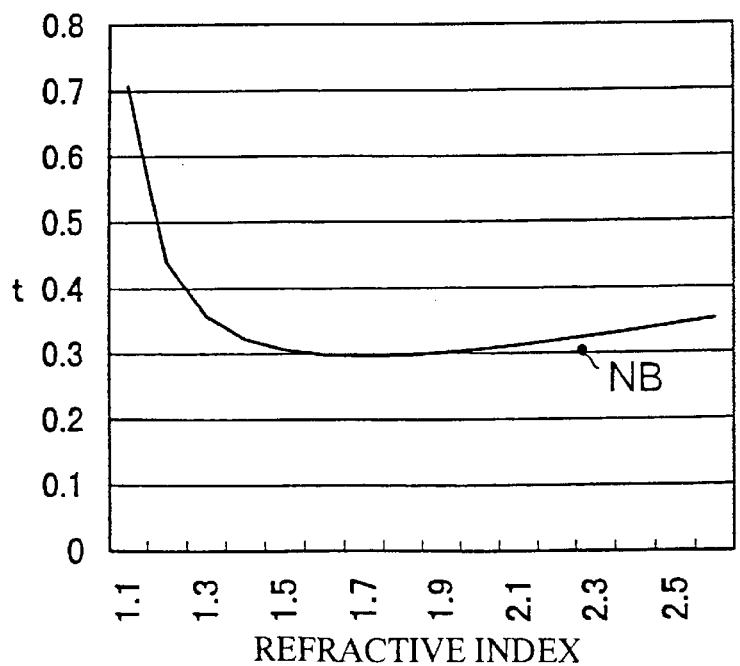
FIG. 12 illustrates yet another method for selecting the combination of the refractive indices and the thicknesses of the birefringent plates.

For instance, if a lens having an open F-number of 1.4, which is included among the lineup of interchangeable lenses that can be used is expected to be used, it is naturally necessary to set the target performance corresponding to this open F-number. FIG. 12 presents the results of the evaluation (NB) obtained by using lithium niobate to constitute the first birefringent plate 1*a* and the second birefringent plate 1*d* with K=0.33, B=3 and Fno=1.4.

The explanation has been given thus far on an example in which the optical filter 1 according to the present invention is employed in combination with an imaging device constituted through a so-called square pixel array whereby the pixels at the imaging device 15 are arrayed in the same array pitch in both the longitudinal and the lateral directions. However, the imaging device 15 is not necessarily required to assume a square pixel array. If the imaging device 15 does not assume a square pixel array, it is necessary to set different separating distances for the image effected by the two birefringent plates 1*a* and 1*d* corresponding to the array pitches in the longitudinal and lateral directions. In such a case, a method whereby the two birefringent plates having different thicknesses are constituted of the same material, a method whereby the two birefringent plates are constituted of materials having different refractive indices to achieve the same thickness or a method whereby the two birefringent plates are formed to have different thicknesses and different refractive indices from each other, may be adopted.

Figure 13:
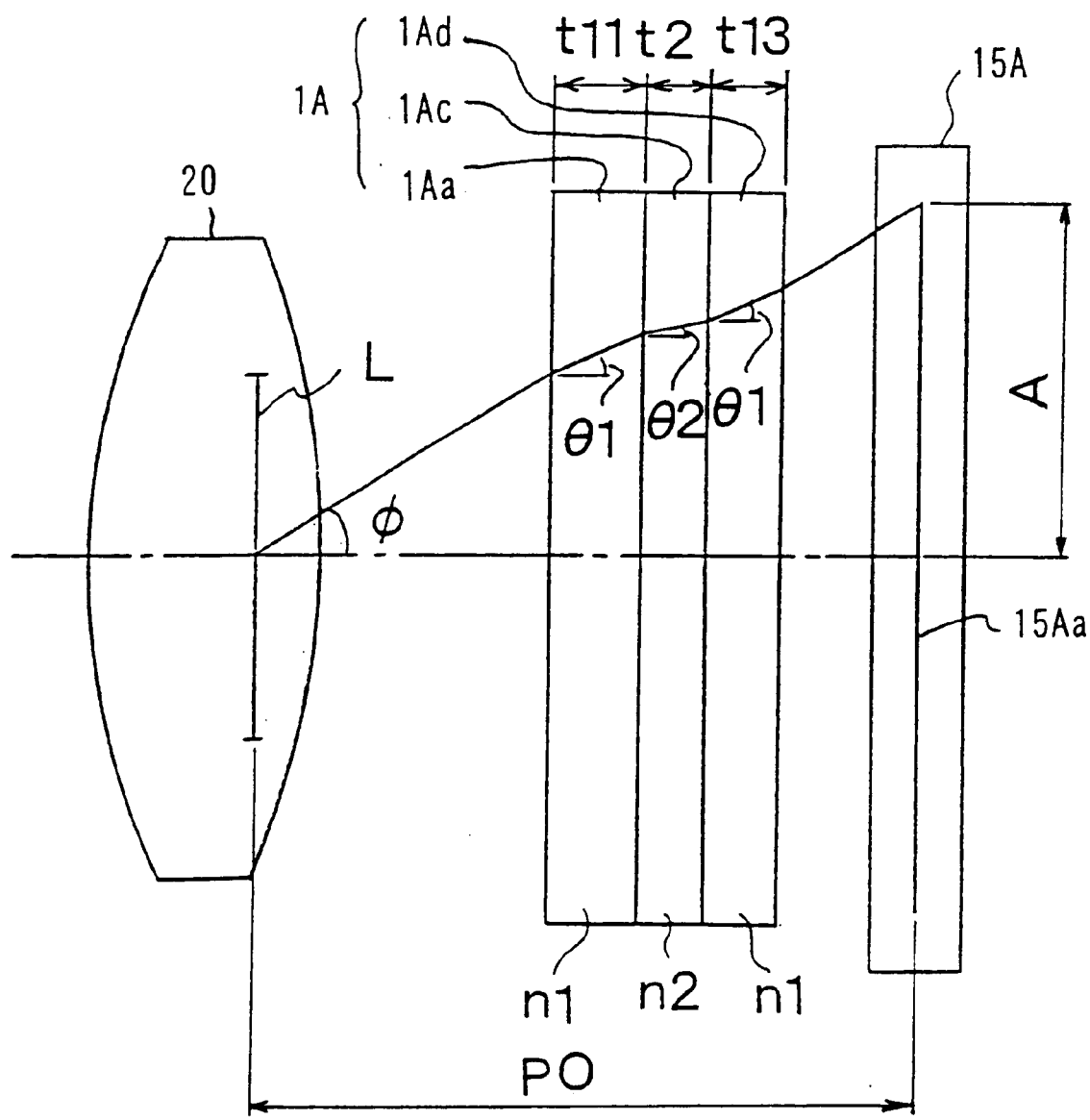
FIG. 13 presents a schematic structure of the optical low-pass filter in an embodiment of the present invention, illustrating an example of a combination of two birefringent plates having equal refractive indices and different thicknesses.

FIG. 13 illustrates an example in which a single material is used to constitute the two birefringent plates, formed to have different thicknesses. In FIG. 13, with t11 and t12 respectively representing the thicknesses of a first birefringent plate 1Aa and a second birefringent plate 1Ad constituting an optical filter 1A provided between the taking lens 20 and an imaging device 15A, a conditional equation corresponding to equation (35) is presented as the following equation (43).

$$t11 + t12 \leq C1 \times \frac{n1}{Y(n1)} \tag{43}$$

with $$Y(n1) = 1 - \frac{\cos\phi}{\cos\theta 1} \tag{44}$$

$$C1 = K \times B \times d \times Fno - \left(1 - \frac{\cos\phi}{\cos\theta 2}\right) \times \frac{t2}{n2} = const. \tag{45}$$

$$\sin\theta 1 = \frac{\sin\phi}{n1} \tag{46}$$

$$\theta 1 = \sin^{-1}\left(\frac{\sin\phi}{n1}\right) \tag{47}$$

$$\theta 2 = \sin^{-1}\left(\frac{n1 \times \sin\phi}{n2}\right) \tag{48}$$

When the thicknesses of the two birefringent plates are different, a graph corresponding to that in FIG. 10 is drawn in a similar manner by using (n1, t11+t12) as a variable. The selected birefringent material is evaluated at a point with the X coordinate value represented by its refractive index n1 and the Y coordinate value represented by the total (t11+t12) of the thicknesses t11 and t12 determined by the required image separating distances.

Figure 14:
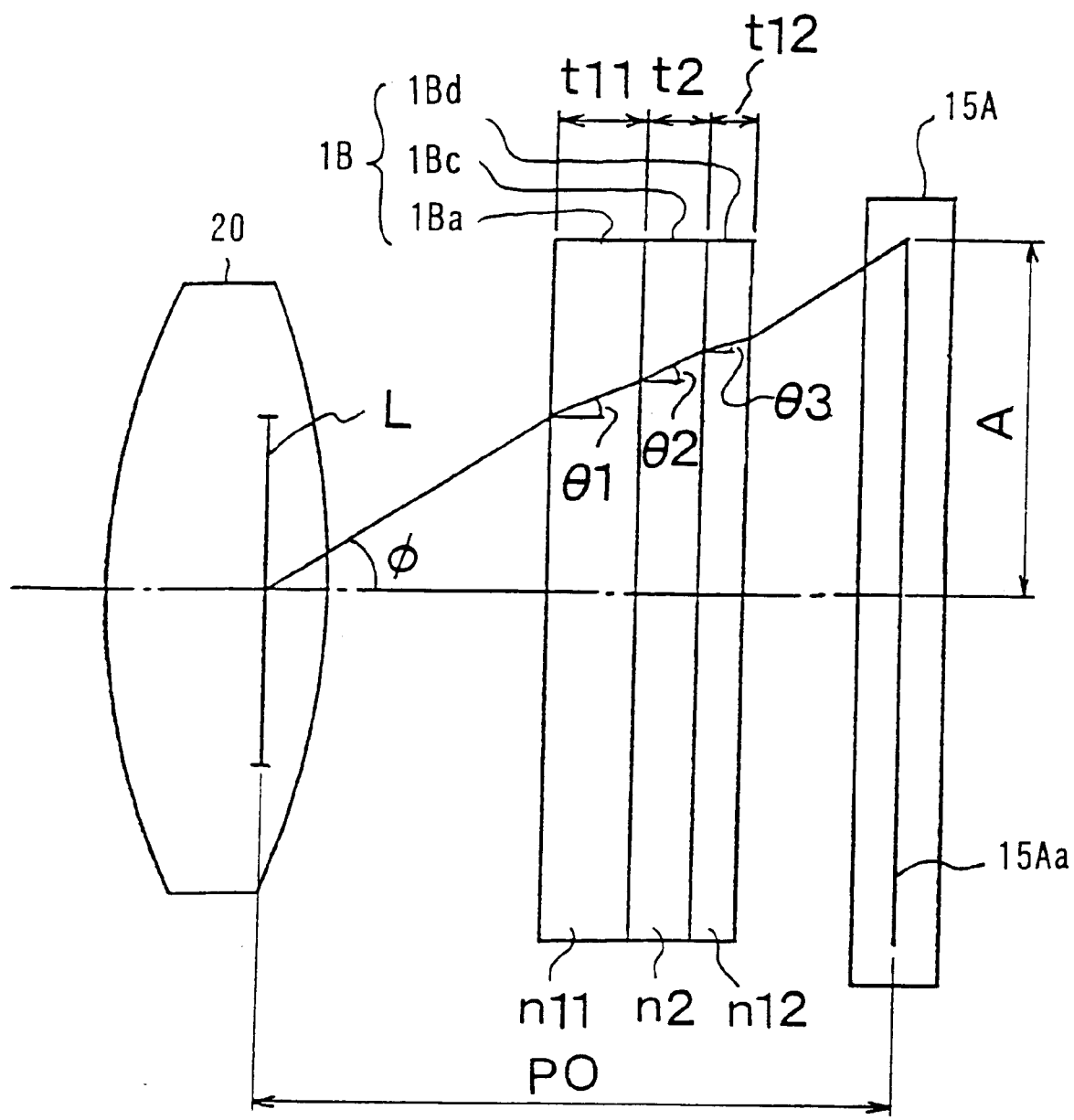
FIG. 14 presents a schematic structure of the optical low-pass filter in an embodiment of the present invention, illustrating an example of a combination of two birefringent plates having different thicknesses and refractive indices.

An example constituted of two birefringent plates having different thicknesses and different refractive indices is illustrated in FIG. 14. With t11 and t12, and n11 and n12 respectively representing the thicknesses and the refractive indices of a first birefringent plate 1Ba and a second birefringent plate 1Bd constituting an optical filter 1B provided between the taking lens 20 and the imaging device 15A in FIG. 14, a conditional equation corresponding to equation (35) is presented as the following equation (49).

$$\left(1 - \frac{\cos\phi}{\cos\theta 1}\right) \times \frac{t11}{n11} + \left(1 - \frac{\cos\phi}{\cos\theta 3}\right) \times \frac{t12}{n12} \leq C2 \tag{49}$$

with $$C2 = K \times B \times d \times Fno - \left(1 - \frac{\cos\phi}{\cos\theta 2}\right) \times \frac{t2}{n2} = const. \tag{50}$$

$$\sin\theta 1 = \frac{\sin\phi}{n11} \tag{51}$$

$$\theta 1 = \sin^{-1}\left(\frac{\sin\phi}{n11}\right) \tag{52}$$

$$\theta 2 = \sin^{-1}\left(\frac{n11 \times \sin\theta 1}{n2}\right) \tag{53}$$

$$\theta 3 = \sin^{-1}\left(\frac{n2 \times \sin\theta 2}{n12}\right) \tag{54}$$

While the explanation has been given in reference to the embodiments above on an example in which the present invention is adopted in an optical filter for a DSC, the present invention may be adopted in other types of cameras provided with a solid-state imaging device such as a video camera or in an optical apparatus such as an image scanner or the like.

While the explanation has been given above with respect to the advantage of reducing the degree of focus misalignment occurring in the direction of the optical axis between the central area of the image plane and the periphery of the image plane by reducing the thickness of the optical filter in reference to an example in which only the optical filter is provided between the taking lens 20 and the imaging device 15, an infrared blocking filter may be provided together with the optical filter. It is obvious that the focus misalignment attributable to the thickness of the infrared blocking filter must also be taken into consideration in this case.

In addition, in the explanation given above, the first birefringent plate 1a and the second birefringent plate 1d constituting the optical filter 1 utilized in combination with the imaging device 15 having the square pixel array illustrated in FIG. 6 have the same thickness t1 and the same refractive index n1. However, the present invention is not restricted to this example. Namely, the separating distance achieved when an incident light flux is separated into two spatially separate light fluxes by one birefringent plate is determined by the product of the thickness and the refractive index of the birefringent plate and thus, two birefringent plates having different thicknesses and refractive indices may be adopted in combination in an imaging device having a square pixel array. Furthermore, the relative angle of the directions in which the light is separated by the first and second birefringent plates is not restricted to 90°, and various angles may be set including 30°, 45°, 60° and so forth, depending upon the separation pattern to be achieved.

Prevention of Shadows of Foreign Matter Cast onto Input Image

Figure 15:
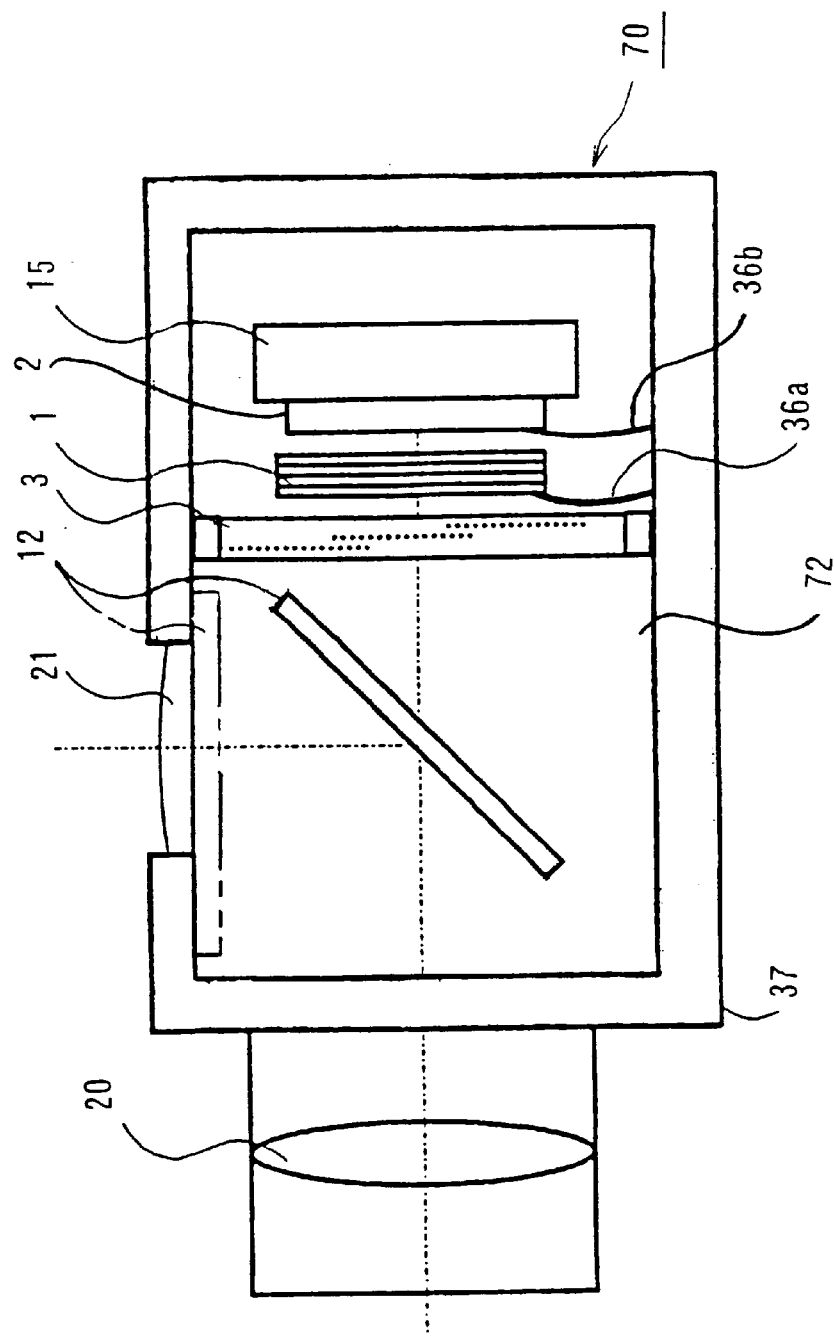
FIG. 15 illustrates an example in which the present invention is adopted in a camera.

FIG. 15 schematically illustrates an essential portion of an interchangeable lens type single lens reflex type DSC in which the present invention is adopted (hereafter, an interchangeable lens type single lens reflex DSC is simply referred to as a "camera"). A taking lens 20 which can be exchanged to suit particular purposes of photographing is mounted at a camera main body 70. Inside a mirror box 72 of the camera main body 70, a mirror 12, a shutter unit 3, an optical filter 1, an imaging device 15 and the like are provided. A focusing screen 21 is provided above the mirror box 72.

The mirror 12 is automatically switched between a lowered state i.e., the state indicated by the solid line in FIG. 15, and a raised state, i.e., the state indicated by the 2-point chain line in FIG. 15, in correspondence to the operating state of the camera. The shutter unit 3 blocks light during an imaging signal read operation at the imaging device 15 which is provided, together with the optical filter 1, to the rear of the shutter unit 3. Since the optical filter 1 assumes a structure identical to that illustrated in FIG. 1, its explanation is omitted.

Figure 16:
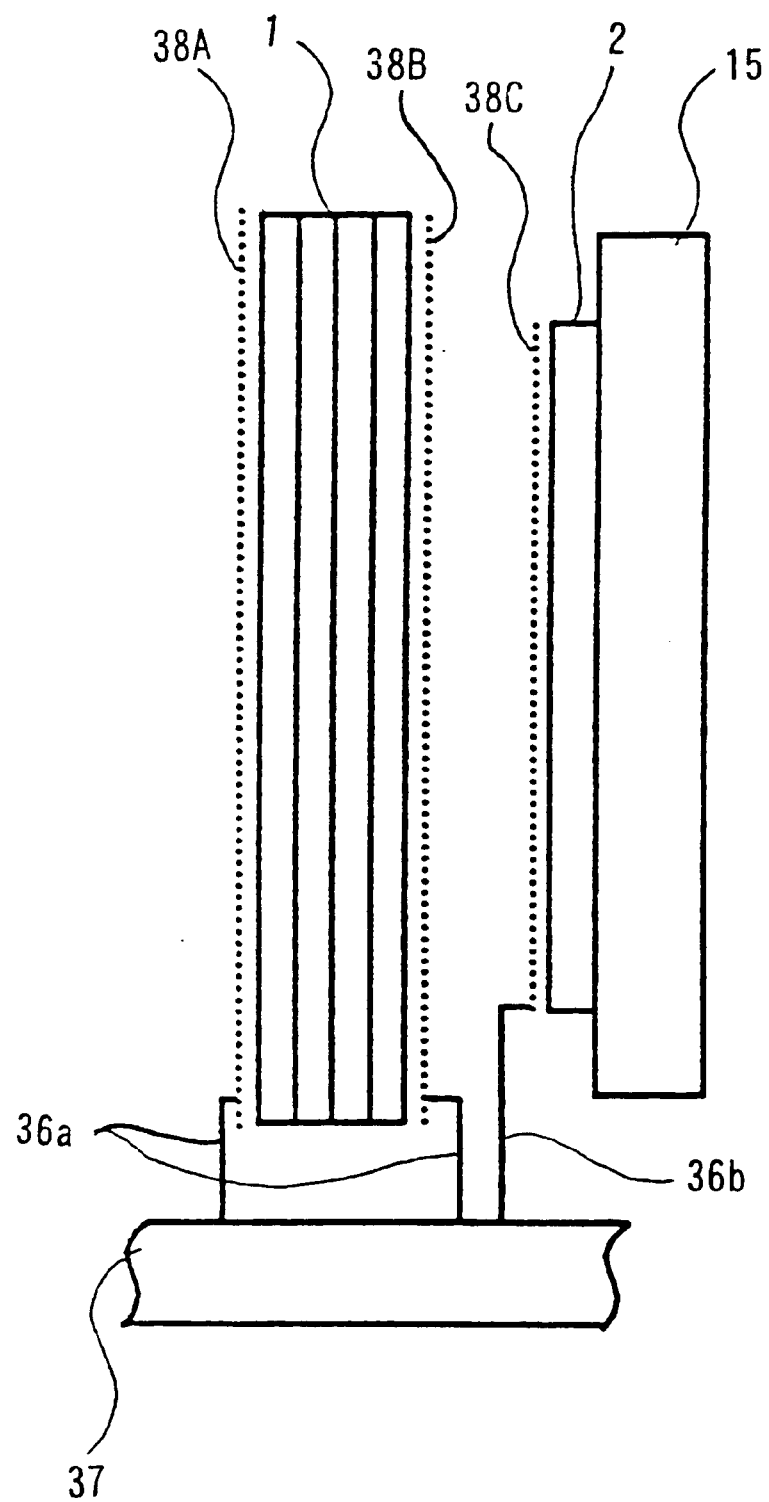
FIG. 16 is an enlargement of the area in which the optical filter and the imaging device are provided in the camera.

FIG. 16 is an enlargement of the area where the optical filter 1 and the imaging device 15 are provided in the camera illustrated in FIG. 15. Transparent electrodes 38A and 38B constituted of a Nesa film or the like are respectively formed at the entry surface and the exit surface of the optical filter 1. A transparent electrode 38C constituted of a Nesa film or the like is also formed at the front surface of a seal glass 2 provided at the photosensitive surface of the imaging device 15. These transparent electrodes 38A–38C are connected to a conductive area of a casing 37 via a conductive connection portion 36a or 36b as detailed later.

Figure 17A:
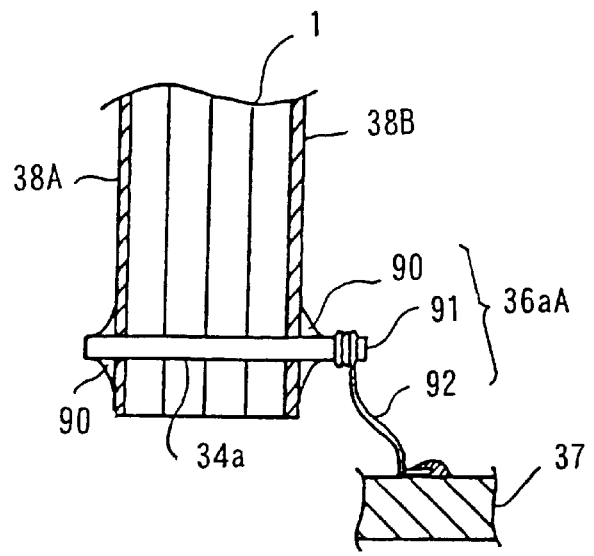
FIGS. 17A–17D illustrate structural examples of the conductive connection portions through which the electrical charge stored at the optical filter is released.

The optical filter 1 and the casing 37, the conductive connection portions between the transparent electrodes 38A and 38B formed at the front surface of the optical filter 1 and the casing 37 are explained in reference to FIGS. 17A–17D, which illustrate these components in partial enlargements. In FIG. 17A, a through hole 34a is bored at the optical filter 1. A conductive pin 91 is inserted through the through hole 34a, and the pin 91 and the transparent electrodes 38A and 38B are bonded by using a conductive adhesive 90 such as silver paste. This achieves an electrically continuous state for the pin 91 and the transparent electrodes 38A and 38B. One end of a wire 92 is soldered onto the pin 91, with another end of the wire 92 soldered to the conductive area of the casing 37. It is to be noted that the wire 92 and the conductive area of the casing 37 may be connected with each other by attaching a lug plate or the like (not shown) to the wire 92 through soldering or crimping and securing the lug plate or the like to the casing 37 through screwing. Thus, the transparent electrodes 38A and 38B are connected to the conductive area of the casing 37 so that their potentials are set equal to the potential at the conductive area. As described above, a conductive connection portion 36aA in the example illustrated in FIG. 17A is constituted of the conductive adhesive 90, the pin 91 and the wire 92.

Figure 17B:
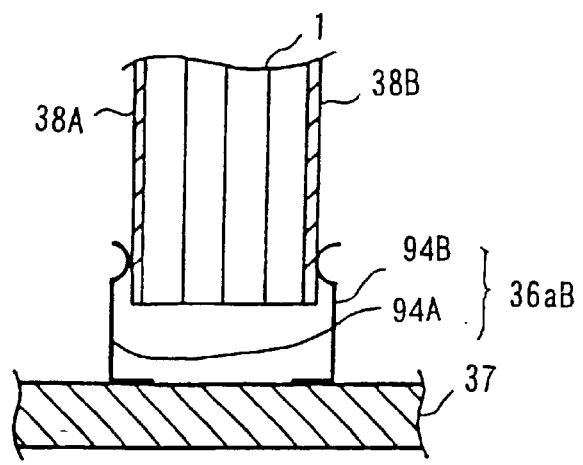
Figure 17C:
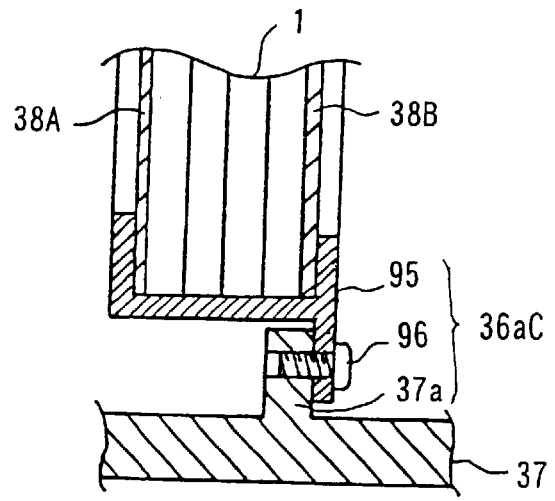

The conductive connection portion at which the transparent electrodes 38A and 38B are connected with the conductive area of the casing 37 may assume a structure illustrated in FIG. 17B or FIG. 17C, instead, and the following is an explanation of these structures. In FIG. 17B, conductive members 94A and 94B having a spring property are secured at the conductive area of the casing 37 in a state that allows electrical continuity. A resilient restoring force imparted by the conductive members 94A and 94B presses the transparent electrode 38A in contact against the conductive member 94A and the transparent electrode 38B in contact against the conductive member 94B respectively. Thus, the transparent electrodes 38A and 38B are both connected to the conductive area of the casing 37 with their potentials set equal to that at the conductive area. In other words, in the example illustrated in FIG. 17B, a conductive connection portion 36aB is constituted of the conductive members 94A and 94B.

In FIG. 17C, the optical filter 1 is held by a frame body 95 having a conductive property, and the transparent electrodes 38A and 38B are in contact with the frame body 95 in a state that allows electrical continuity. The frame body 95 is retained at a fixing portion 37a formed at the conductive area of the casing 37 through tightening of screws 96. Thus, the transparent electrodes 38A and 38B are both connected to the conductive area of the casing 37 with their potentials set equal to that at the conductive area. In other words, a conductive connection portion 36aC in the example presented in FIG. 17C is constituted of the frame body 95, the screws 96 and the fixing portion 37a.

Figure 17D:
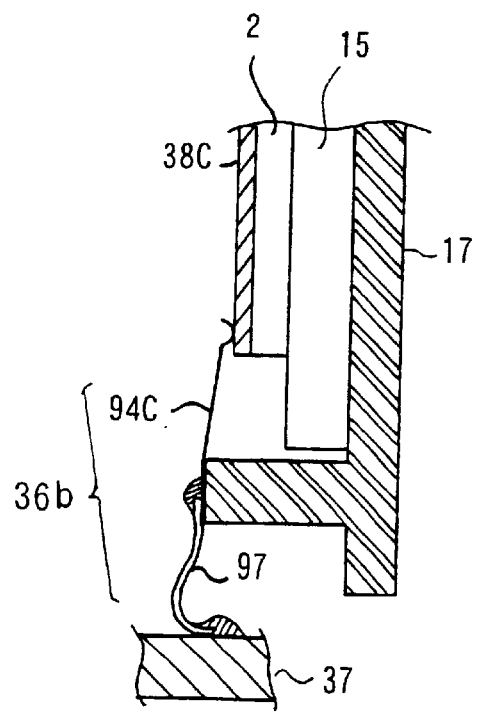

Now, in reference to FIG. 17D, the conductive connection portion 36b at which the transparent electrode 38C formed at the front surface of the seal glass 2 of the imaging device 15 and the conductive area of the casing 37 are connected in explained. A conductive member 94C having a spring property is secured at the bracket 17 holding the imaging device 15, with the conductive member 94C placed in contact with the transparent electrode 38C. One end of a wire 97 is soldered onto the conductive member 94C, with another end of the wire 97 soldered onto the conductive area of the easing 37. As in the conductive connection portion 36aA illustrated in FIG. 17A, the wire 97 and the casing 37 may be connected by attaching a lug plate (not shown) to the wire 97 through soldering or crimping and by retaining the lug plate or the like at the casing 37 through screwing. As explained above, the conductive connection portion 36b in the example illustrated in FIG. 17D is constituted of the conductive member 94C and the wire 97.

In the camera structured an described above, the mirror 12 is in a lowered state as illustrated in FIG. 15 during a photographing preparation operation, i.e., when the photographer is engaged in an operation related to framing (monitoring of a viewfinder image), adjustment of the exposure value, focal point adjustment and the like. Thus, the image of the subject formed by the taking lens 20 is reflected upward by the mirror 12 so that an image can be formed on the focusing screen 21. The photographer monitors the subject image formed on the focusing screen 21 via a viewfinder lens system (not shown).

During a photographing operation, the mirror 12 swings upward and subsequently, after the shutter unit 3 has been engaged in an open/close operation, the mirror 12 is lowered. Through this sequence of operations, the light from the subject guided by the taking lens 20 is transmitted through the optical filter 1 to enter the imaging device 15.

In the camera described above, the transparent electrodes 38A and 38D formed at the two surfaces of the optical filter 1 and the transparent electrode 38C formed at the front surface of the seal glass 2 at the imaging device 15 are all connected to the conductive area of the casing 37 via the conductive connection portion 36a and the conductive connection portion 36b respectively. This prevents the optical filter 1 and the imaging device 15 from becoming electrically charged. As a result, dust and lint are prevented from becoming adhered to the optical filter 1 and the seal glass 2 located near the focal plane of the taking lens 1.

Now, a discharge may occur in a camera in the prior art when its optical filter becomes electrically charged and the difference in the potential occurring between the optical filter and the photoelectric conversion element increases to a certain degree. When such a discharge occurs, noise may be superimposed on a signal output by the photoelectric conversion element. In addition, depending upon the extent of the discharge, the photoelectric conversion element itself may even be destroyed. In contrast, since the optical filter 1 and the imaging device 15 are connected with each other with their potentials set equal to each other via the conductive area of the casing 37 in the camera in this embodiment, there is no difference in the potential, thereby eliminating the problem described above.

In the explanation given above in reference to FIGS. 15, 16 and 17A–17D, the transparent electrodes 38A and 38B formed at the two surfaces of the optical filter 1 and the transparent electrode 38C formed at the front surface of the seal glass 2 are both connected to the conductive area of the casing 37 in a continuous state. The camera that is to be explained next differs from this structure in that the transparent electrodes 38A–38C are connected with one another to achieve equal potentials and that a voltage source is connected between the transparent electrodes 38A–38C and the conductive area of casing 37. Thus, the explanation is now given mainly on these differences. Since the other structural features are identical to those illustrated in FIGS. 15, 16 and 17A–17D, their explanation is omitted.

Figure 18:
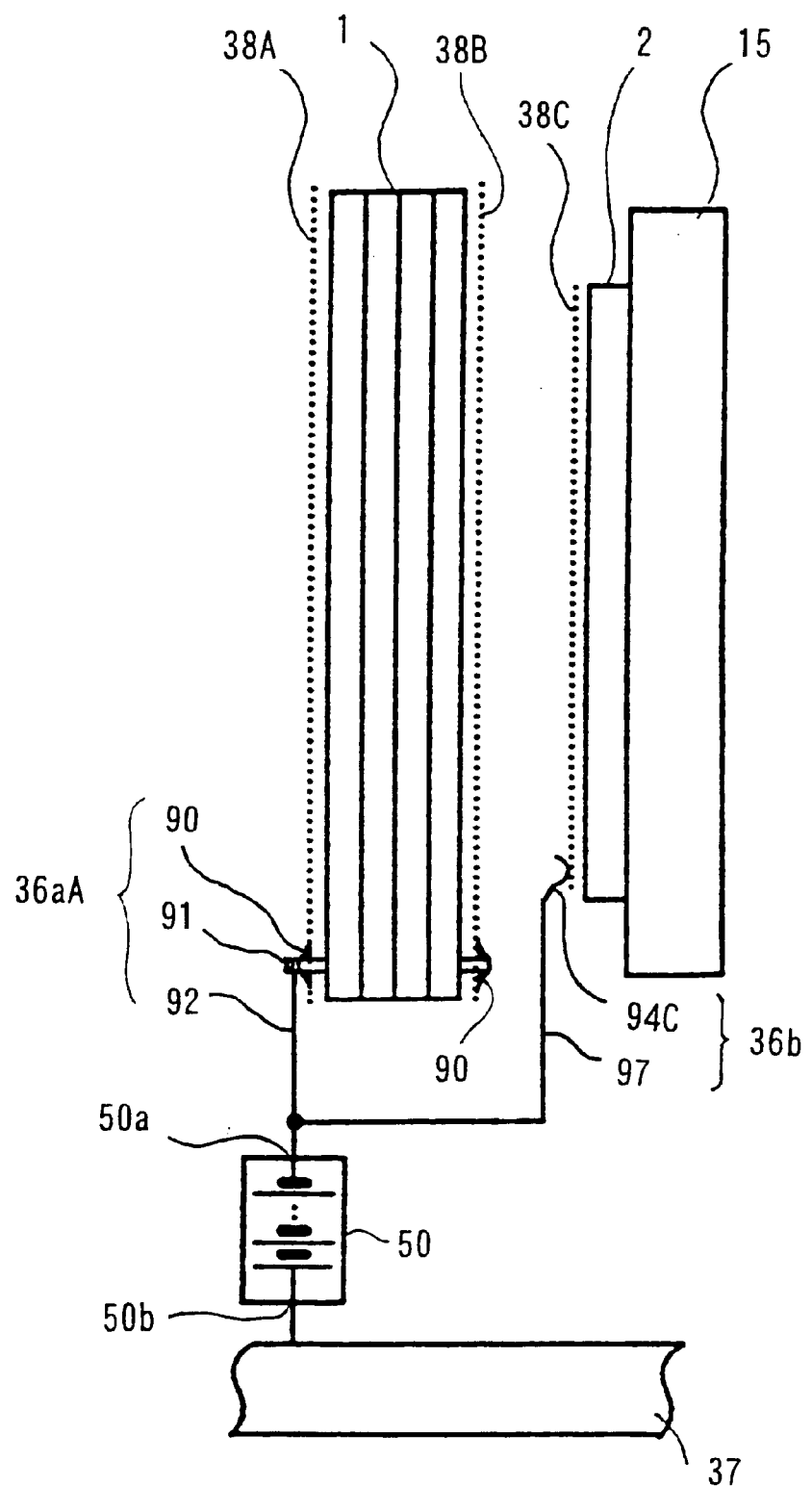
FIG. 18 illustrates an essential portion of another example in which the present invention is adopted in a camera.

FIG. 18 is an enlargement similar to that in FIG. 16, which illustrates the portion of the camera where the optical filter 1 and the imaging device 15 are provided. In FIG. 18, the same reference numbers are assigned to components identical to those illustrated in FIGS. 16 and 17A–17D to preclude the necessity for an explanation thereof. While the transparent electrodes 38A and 38B are connected to a terminal 50a of a voltage source 50 via a conductive connection portion 36aA, the transparent electrode 38C is connected to the terminal 50a of the voltage source 50 via a conductive connection portion 36b. A terminal 50b of the voltage source 50 is connected to the conductive area of the casing 37. It is to be noted that while the voltage source 50 is illustrated as a DC source for purposes of achieving maximum convenience in illustration, with the side on which the terminal 50b is present set to (+), the present invention is not restricted to this example. Specifically, the potential resulting from an electrical charge varies depending upon the material constituting the optical filter 1, and it is desirable to adjust the polarity and the voltage at the voltage source 50 to achieve the maximum effect in preventing an electrical charge in correspondence to the specific type of material used.

In addition, the voltage generated by the voltage source 50 may be an AC voltage instead of a DC voltage. If an AC voltage is generated by the voltage source 50, its frequency should be set within the range of approximately several kHz to twenty kHz.

By adopting the structure described above, the potential generated by the voltage source 50 is applied to the transparent electrodes 38A–38C relative to the casing 37 to inhibit any electrical charge from occurring at the optical filter 1 and the imaging device 15.

Figure 19:
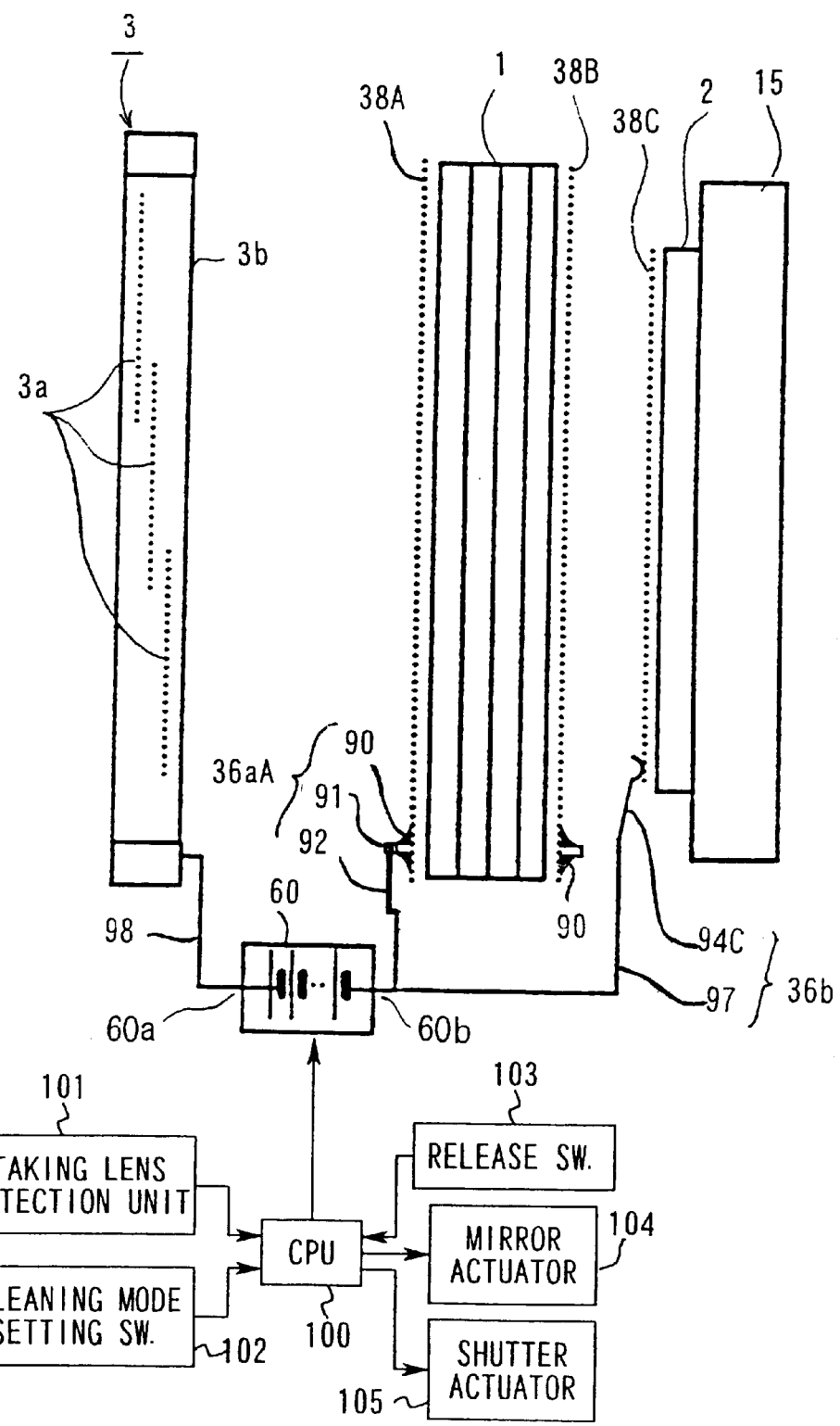
FIG. 19 illustrates an essential portion of yet another example in which the present invention is adopted in a camera.

FIG. 19 is an enlargement similar to that in FIG. 16, which illustrates the portion of the camera where the optical filter 1 and the imaging device 15 are provided. In FIG. 19, the same reference numbers are assigned to components identical to those illustrated in FIGS. 16 and 17A–17D to preclude the necessity for an explanation thereof. In addition, since the structural features other than that illustrated in FIG. 19 are similar to those illustrated in FIG. 15, their explanation is omitted.

When the movable members such as a blade 3a and the like in the shutter unit 3 are constituted of non-conductive materials, static electricity may be generated by the movement of the movable members to result in an electrical charge occurring at the shutter unit 3 and the optical filter 1 provided near the shutter unit 3. The structure illustrated in FIG. 19 achieves prevention of an electrical charge from occurring at the shutter unit 3 and the optical filter 1 during the operation of the shutter unit 3.

A base plate 3b of the shutter unit 3 is constituted of a conductive material such as aluminum, brass or plastic containing a carbon fiber. A lug plate (not shown), for instance, is connected to one end of a wire 98 so that the wire 98 is screwed onto the base plate 3b via the lug plate. Thus, the base plate 3b and the wire 98 become electrically connected with each other. Another end of the wire 98 is connected to a terminal 60a of a voltage source 60. While the transparent electrodes 38A and 38B are connected to a terminal 60b of the voltage source 60 via a conductive connection portion 36aA, the transparent electrode 38C is connected to the terminal 60b of the voltage source 60 via a conductive connection portion 36b. It is to be noted that as explained earlier in reference to FIG. 18, selections are made in regard to the polarity of the voltage source 60, whether a DC voltage or an AC voltage is to be generated, the frequency of the voltage if an AC voltage is generated and the voltage level, to achieve an optimal state for preventing the shutter unit 3, the optical filter 1 and the imaging device 15 from becoming electrically charged.

By adopting the structure described above, static electricity is prevented from being generated during the operation of the movable members in the shutter unit 3.

It is to be noted that while none of the shutter unit 3, the optical filter 1 and the imaging device 15 is connected to the conductive area of the casing 37 in FIG. 19, the terminal 60a or 60b of the voltage source 60 may be connected to the conductive area of the casing 37. For instance, by connecting the terminal 60b to the conductive area of the casing 37, static electricity that may be generated at the optical filter 1 and the imaging device 15 can be suppressed without having to generate a voltage with the voltage source 60.

Now, foreign matter tends to enter the mirror box 72 (see FIG. 15) during a lens exchange or the like in a single lens reflex type DSC which allows taking lens exchange. Thus, it is desirable that the inside of the mirror box 72 be cleaned on a regular basis. During such a cleaning process, foreign matter that has become adhered to the optical filter 1 and the like may not be readily removed even with air blown by using a blower or the like. However, the camera explained above in reference to FIG. 19 facilitates the cleaning process as explained below.

In FIG. 19, a taking lens detection unit 101 for detecting whether or not the taking lens 20 (see FIG. 15) is attached, a cleaning mode setting switch 102 for setting the cleaning mode for the camera, a release switch 103, a mirror actuator 104 for moving the mirror 12 (see FIG. 15) vertically by interlocking with the photographing operation and a shutter actuator 105 for driving the shutter unit 3 are connected to a CPU 100 that controls the camera operation. This CPU 100 is further connected with the voltage source 60.

The camera user removes the taking lens 20 from the camera main body 70, sets the cleaning mode for the camera by operating the cleaning mode setting switch 102 and turns on the release switch 103. In response to this, the CPU 100 provides a control signal to the mirror actuator 104 and the shutter actuator 105 to set the member 12 in a raised state, i.e., the state indicated by the 2-point chain line in FIG. 15 and to set the shutter unit 3 in an open state. Next, the CPU 100 provides a control signal to the voltage source 60 to cause the voltage source 60 to generate a specific voltage. At this time, either an AC voltage or a DC voltage may be generated by the voltage source 60. This neutralizes electrical charges at the shutter unit 3, the optical filter 1 and the imaging device 5 to reduce the force with which foreign matter adheres to the optical filter 1 and the imaging device 15 (the attractive force generated by static electricity).

In addition, the foreign matter that is adhering to the optical filter 1, the imaging device 15 and the like may itself be electrically charged. In such a case, the foreign matter may be lifted off the optical filter 1 or the imaging device 15 by generating an AC voltage with the voltage source 60 or by applying a DC voltage having a polarity which will generate a repulsive force against the adhering foreign matter, The foreign matter can be removed with ease by the camera user with a blower or the like to blow air into the inside of the mirror box 72 in the state in which the voltage is being generated by the voltage source 60 as described above. At this time, the foreign matter can be removed even more effectively by employing an apparatus that electrically charges the air blown out of the blower to generate an attractive force to attract the foreign matter with the electrically charged air blown out of the apparatus.

After the cleaning process is completed as described above, the CPU 100 interlocks with the camera user operation in which the release switch 103 is turned on again to transmit a control signal to the voltage source 60, the mirror actuator 104 and the shutter actuator 105. This stops the voltage generation at the voltage source 60, closes the shutter unit 3 and lowers the mirror 12.

The cleaning mode described above may be also adopted in the camera explained earlier in reference to FIG. 18. In addition, while the source 50 in the camera explained in reference to FIG. 18 and the source 60 in the camera explained in reference to FIG. 19 are provided inside the cameras, these voltage sources 50 and 60 may be omitted to supply a voltage from an external source provided outside the camera. In that case, the terminals 50a and 50b or the terminals 60a and 60b should be set in a shorted state during normal operation. Then, when the cleaning mode is set, a voltage is applied by the external voltage source to the terminals 50a and 50b or the terminals 60a and 60b. By adopting this structure, a more compact, lighter and less costly camera is achieved with ease. At the same time, the removal of foreign matter is facilitated.

While the explanation given above in reference to FIGS. 15–19 uses an example in which the present invention is adopted in an interchangeable lens type DSC, the present invention may also be adopted in a fixed taking lens type DSC. In addition, while the explanation is given on an example of a direct image forming type camera constituted by providing the optical filter 1 and the imaging device 15 near the primary image forming plane of the taking lens, the present invention may be adopted in a DSC provided with a relay lens system as explained below in reference to FIG. 20.

Figure 20:
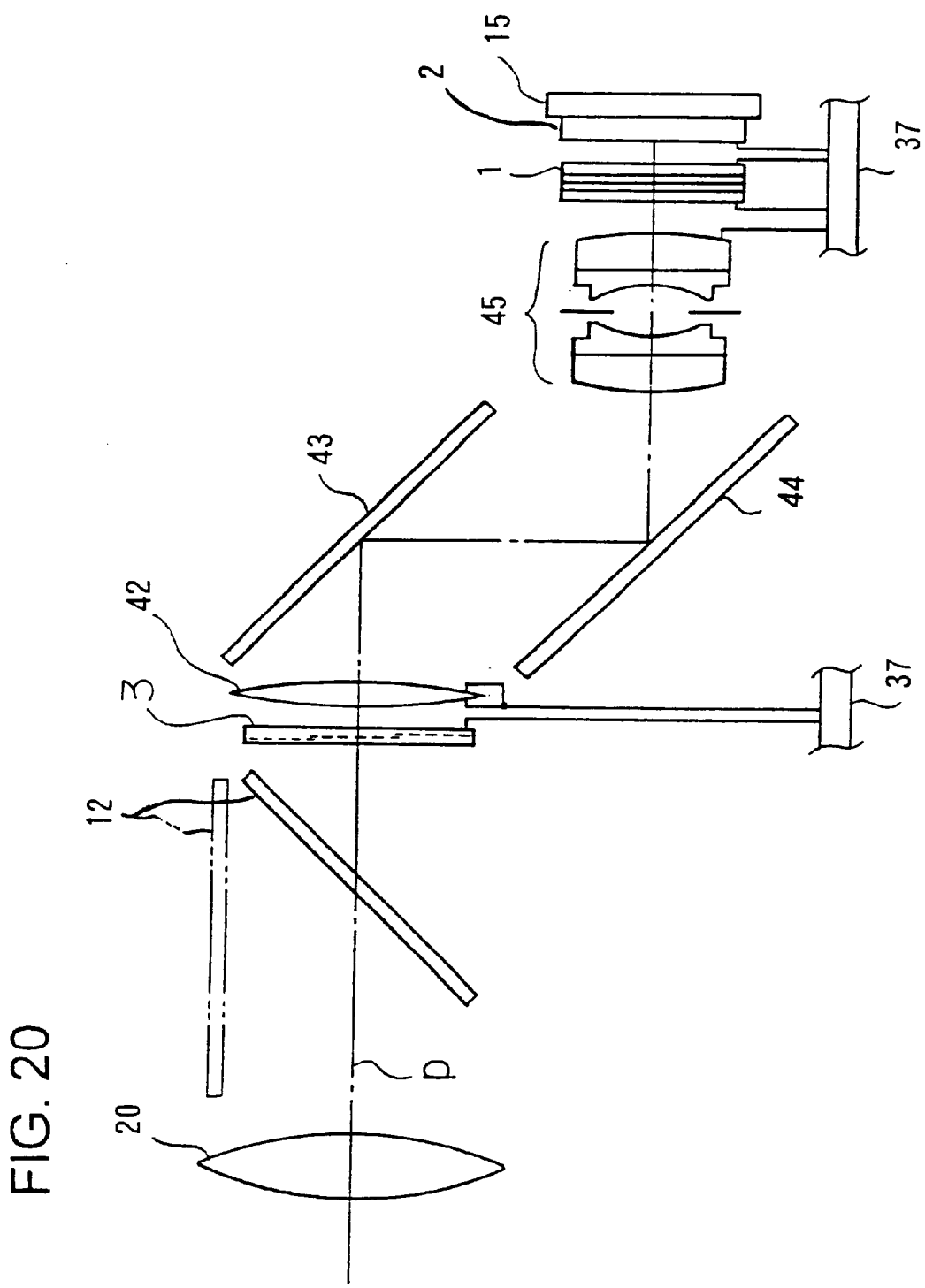
FIG. 20 illustrates an example in which the present invention is adopted in a camera having a relay lens system.

FIG. 20 illustrates a schematic structure of an interchangeable lens type DSC provided with a relay lens system comprising a field lens 42 and a relay lens 45, with the same reference numbers assigned to components identical to those in the interchangeable lens type DSC illustrated in FIG. 15 so that the explanation can be focused on the differences from the camera illustrated in FIG. 15.

The following explanation is given in reference to an assumed state, i.e., the photographing state in which the mirror 12 is as indicated by the 2-point chain line in FIG. 20 and the shutter unit 3 is open. The field lens 42 is provided near the primary image forming plane of the taking lens 20. Behind the field lens 42, mirrors 43 and 44 for bending the optical path are provided, and behind the mirror 44, the relay lens 45 is provided. An image of the subject formed on the primary image forming plane of the taking lens 20 is transmitted through the field lens 42, the mirror 43, the mirror 44, the relay lens 45 and the optical filter 1 to become reformed on the photosensitive surface of the imaging device 15 in a reduced size. In other words, the photosensitive surface of the imaging device 15 constitutes the secondary image forming plane of the taking lens 20. On an optical path "p" indicated by the 1-point chain line in FIG. 20, a shadow will be cast on the subject image formed on the photosensitive surface of the photoelectric conversion element 15 even by foreign matter such as dust and lint present near either the primary image forming plane or the secondary image forming plane. In order to eliminate this concern, it is desirable to provide transparent electrodes on the front surface of the field lens 12 and on the exit surface of the relay lens 15 and to connect the transparent electrodes to the conductive area of the casing 37, the voltage source 50 (see FIG. 18) or the voltage source 60 (see FIG. 19).

While the explanation has been given above on an example of application of the present invention in a camera, the present invention may be adopted in other optical apparatuses. The following is an explanation of an example in which the present invention is adopted in an image input apparatus (image scanner) given in reference to FIG. 21.

Figure 21:
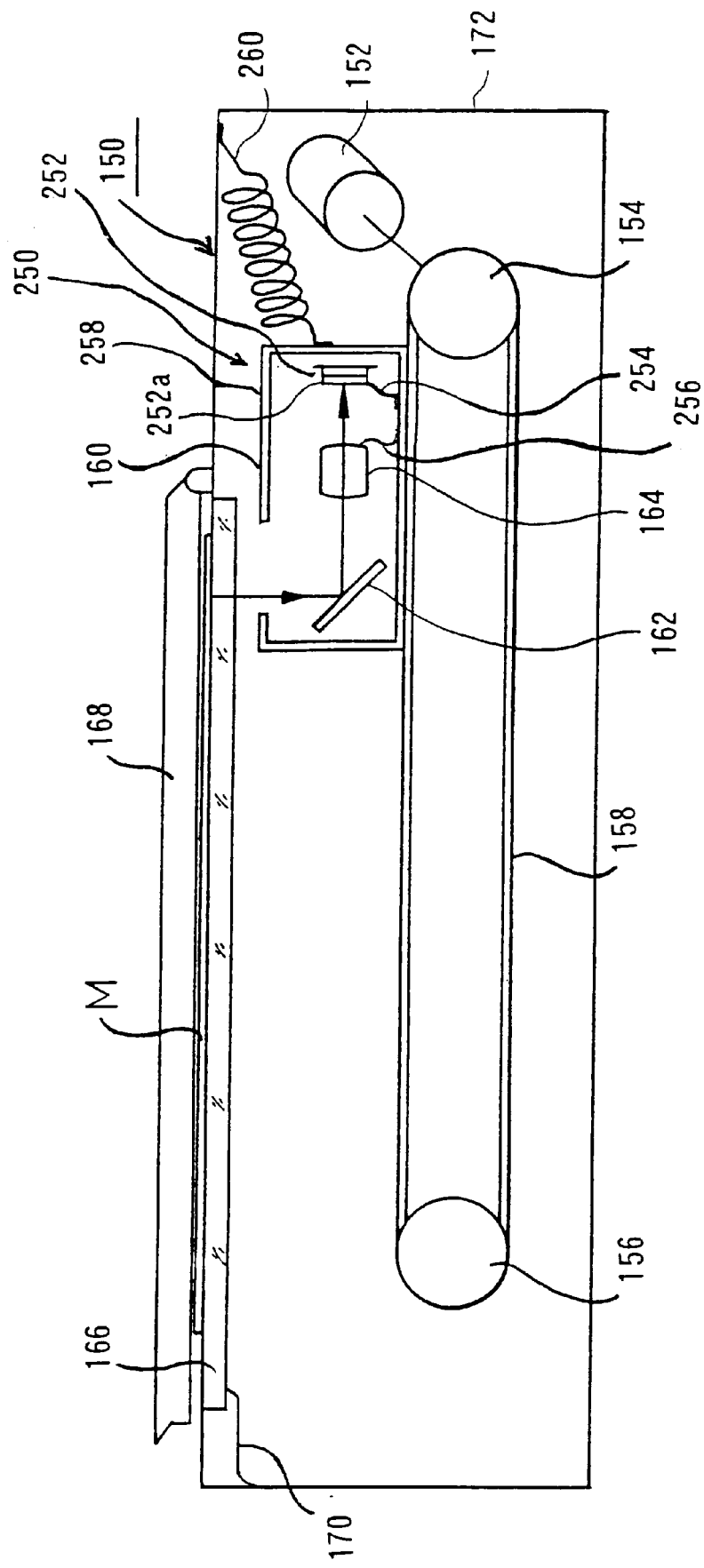
FIG. 21 illustrates an example in which the present invention is adopted in an image reading device (image scanner).

In FIG. 21, which illustrates a schematic structure of an image input apparatus, an image input unit 250 comprises a mirror 162, an image forming lens 164, and imaging device 252, a housing 258 for housing these members and the like. At the imaging device 252, pixels are arrayed along a single column or over a plurality of columns along the direction extending perpendicular to the page on which FIG. 21 is printed. A ribbed belt (timing belt) 158 is provided connecting between wheels 154 and 156. The image input unit 250 is secured at the ribbed belt 158. The wheel 154 is driven to rotate by a stepping motor 152 to drive the image input unit 250 in the horizontal direction relative to the page on which FIG. 21 is printed in a reciprocal movement. These components are housed in a casing 172. A platen glass 166 is provided at an opening at the top of the casing 172, and a document holder 168 which is capable of covering the entire platen glass 166 is further provided.

A host computer (not shown) is connected to the image input apparatus 150 structured as described above. In response to an operation of the host computer by the operator after he sets a document M to be read on the platen glass 166, the host computer issues an image input command to the image input apparatus 150. In response to this image input command, the image input apparatus 150 starts an image input of the document M and transfers the image data to the host computer. In other words, an operation in which an image of the document M formed by the image forming lens 164 is linearly read by the imaging device 252 and then the image input unit 250 is made to move in the horizontal direction relative to the surface of the page on which FIG. 21 is printed at a specific moving pitch is repeated to input a two-dimensional image of the document M.

During this process, if foreign matter is adhering to the front surface (document mounting surface) or the rear surface of the platen glass 166, the exit surface of the image forming lens 164 or the photosensitive surface of the imaging device 252, the shadow of the foreign matter will be transferred. In particular, if foreign matter adheres to the exit surface of the image forming lens 114 or the photosensitive surface of the imaging device 252, a shadow will be cast constantly on the image input at specific pixels of the imaging device 252 a line will be transferred onto the input image resulting in a faulty picture.

To deal with this problem, a transparent electrode (not shown) is formed at the rear surface of the platen glass 166 in the image input apparatus illustrated in FIG. 21. This transparent electrode is connected to an electrically conductive area of the casing 172 via a conductive connection portion 170. Likewise, a transparent electrode (not shown) formed at the exit surface of the image forming lens 164 and a transparent electrode (not shown) formed at the front surface of a seal glass 252a of the imaging device 252 are respectively connected to the electrically conductive area of the housing 258 via a conductive connection portion 256 and a conductive connection portion 254. The structure illustrated in FIG. 17B or FIG. 17C, for instance, may be adopted in the conductive connection portions 170, 256 and 254.

The electrically conductive area of the housing 258 and the electrically conductive area of the casing 172 are connected with each other by a conductive member 260 which can be deformed freely, such as a curled or slack flexible printed circuit board (FPC). As a result, even when the image input unit 250 moves in the left and right direction on the page on which FIG. 21 is printed, the electrically continuous state can be maintained for the electrically conductive area of the housing 258 and the electrically conductive area of the casing 172. By adopting the structure explained above, in which the platen glass 166, the exit surface of the image forming lens 164 and the imaging device 252 are all connected with the casing 172 with their potentials set equal to that of the casing 172, generation of static electricity is suppressed. Thus, it becomes possible to prevent foreign matter from adhering to the platen glass 166, the image forming lens 164 or the imaging device 252 to cast a shadow on the input image.

The present invention may be adopted in optical apparatuses other than those in the examples explained above. For instance, it may be adopted in an image input apparatus without an image forming lens, which reads the document to be read by placing the imaging device in close proximity to the document or an image input apparatus that is provided with a light guide constituted in the form of a fiber scope between the object of image input and the imaging device.

What is claimed is:

1. An optical filter comprising:
    a plurality of birefringent plates comprising optical elements that spatially divide incident light along directions each extending perpendicular to a direction in which the incident light advances to achieve two separate light fluxes respectively; and
    at least one phase plate provided between said plurality of birefringent plates, that is capable of creating a specific quantity of a phase difference between a light component vibrating in one vibrating direction and a light component vibrating in another vibrating direction extending perpendicular to said one vibrating direction for the two light fluxes emitted from one of said plurality of birefringent plates, wherein:
    said plurality of birefringent plates are thinner than said phase plate; and
    at least one of said plurality of birefringent plates which is thinner than said phase plate comprises a material with a larger difference between an extraordinary ray refractive index and an ordinary ray refractive index compared to that of a quartz.

2. An optical filter according to claim 1, further comprising:
    an IR cut filter comprising an optical element integrated with said plurality of birefringent plates and said phase plate.

3. An optical filter according to claim 1, wherein:
    an IR cut coating is provided at a surface of at least one of said plurality of birefringent plates and said phase plate.

4. A camera that electrically photographs a subject with an imaging apparatus, comprising:
    an optical filter that comprises:
        a plurality of birefringent plates comprising optical elements that spatially divide incident light along directions, each extending perpendicular to a direction in which the incident light advances to achieve two separate light fluxes respectively; and
        at least one phase plate provided between said plurality of birefringent plates, that is capable of creating a specific quantity of a phase difference between a light component vibrating in one vibrating direction and a light component vibrating in another vibrating direction extending perpendicular to said one vibrating direction for the two light fluxes emitted from one of said plurality of birefringent plates,
        wherein said plurality of birefringent plates are thinner than said phase plate and comprises a material with a larger difference between an extraordinary ray refractive index and an ordinary ray refractive index compared to that of a quartz.

5. An imaging apparatus comprising:
    a photographic optical system;
    an image capturing device that forms an image of light flux having passed through said photographic optical system; and
    an optical filter provided between said photographic optical system and said image capturing device,
    wherein said optical filter comprises:
        a plurality of birefringent plates comprising optical elements that spatially divide incident light along directions, each extending perpendicular to a direction in which the incident light advances to achieve two separate light fluxes respectively; and
        at least one phase plate provided between said plurality of birefringent plates, that is capable of creating a specific quantity of a phase difference between a light component vibrating in one vibrating direction and a light component vibrating in another vibrating direction extending perpendicular to said one vibrating direction for the two light fluxes emitted from one of said plurality of birefringent plates,
        wherein said plurality of birefringent plates are thinner than said phase plate and comprises a material with a larger difference between an extraordinary ray refractive index and an ordinary ray refractive index compared to that of a quartz.

* * * * *